US011573328B2

(12) United States Patent
Henkel

(10) Patent No.: US 11,573,328 B2
(45) Date of Patent: Feb. 7, 2023

(54) METHOD FOR PRECISE POINT POSITIONING IN A SATELLITE NAVIGATION SYSTEM

(71) Applicant: Patrick Henkel, Emmering (DE)

(72) Inventor: Patrick Henkel, Emmering (DE)

(73) Assignee: Patrick Henkel

( * ) Notice: Subject to any disclaimer, the term of this patent is extended or adjusted under 35 U.S.C. 154(b) by 481 days.

(21) Appl. No.: 16/651,864

(22) PCT Filed: Sep. 26, 2018

(86) PCT No.: PCT/EP2018/076182
§ 371 (c)(1),
(2) Date: Mar. 27, 2020

(87) PCT Pub. No.: WO2019/063645
PCT Pub. Date: Apr. 4, 2019

(65) Prior Publication Data
US 2020/0257002 A1    Aug. 13, 2020

(30) Foreign Application Priority Data
Sep. 28, 2017   (EP) .................................... 17193912

(51) Int. Cl.
*G01S 19/04*    (2010.01)
*G01C 21/20*    (2006.01)
(Continued)

(52) U.S. Cl.
CPC .............. *G01S 19/04* (2013.01); *G01C 21/20* (2013.01); *G01S 19/071* (2019.08); *G01S 19/073* (2019.08)

(58) Field of Classification Search
None
See application file for complete search history.

(56) References Cited

U.S. PATENT DOCUMENTS

| 2015/0293233 A1* | 10/2015 | De Jong | ................. | G01S 19/04 342/357.44 |
| 2016/0077213 A1* | 3/2016 | Xianglin | ................. | G01S 19/24 342/357.44 |

(Continued)

OTHER PUBLICATIONS

"An Introduction to GNSS: GPS, GLONASS, BeiDou, Galileo and other Global Navigation Satellite Systems"; no author given; second edition; copyright 2015; noting especially the section, "Precise Point Positioning (PPP)" on pp. 57-58; printed by NovAtel Inc., Calgary, Alberta, Canada. (Year: 2015).*

(Continued)

*Primary Examiner* — Bernarr E Gregory
(74) *Attorney, Agent, or Firm* — St Onge Steward Johnston and Reens LLC

(57) ABSTRACT

Base stations of a satellite navigation system have receivers Phase biases and instrumental and atmospheric errors, are determined and transmitted to navigation devices. Precise Point Positioning includes steps of: obtaining code and phase measurements which were performed on the satellite signals by the plurality of receivers at two or more frequencies, determining separate individual values for a plurality of phase ambiguities and a plurality of the errors based on the code and phase measurements, wherein the receivers are grouped into clusters, and in each cluster a determination of a single cluster solution is performed, in which satellite errors selected from the group of satellite position errors, satellite clock errors and satellite phase biases are determined based on the phase and code measurements performed by the receivers of the respective cluster; and a multi-cluster solution is performed, in which the single cluster solutions are adjusted.

28 Claims, 12 Drawing Sheets

(51) Int. Cl.
G01S 19/07 (2010.01)
G01S 19/00 (2010.01)

(56) References Cited

U.S. PATENT DOCUMENTS

2017/0269230 A1* 9/2017 Dai .................... G01S 19/32
2018/0252819 A1* 9/2018 Gao .................... G01S 19/32

OTHER PUBLICATIONS

"Multi-GNSS Precise Positioning: New Solutions, New Challenge"; no author given; published in the magazine, "InsideGNSS"; Nov./Dec. 2014 issue; pp. 32-33; on the Internet at insidegnss.com. (Year: 2014).*
Blewitt G (1989) Carrier Phase Ambiguity Resolution for the Global Positioning System Applied to Geodetic Baselines up to 2000 km. J of Geophysical Research 94(B8):10,18x 10,203.
Brack A et al: "Sequential Best Integer-Equivariant Estimation for Geodetic Network Solutions", ITM 2013—Proceedings of the 2013 In-Ternational Technical Meeting of the Institute of Navi-Gation, The Institute of Navigation, 8551 Rixlew Lane Suite 360 Manassas, VA 20109, USA, Jan. 27, 2013 (Jan. 27, 2013), pp. 310-317, XP056007972.
Brack A, Henkel P, Günther C (2013) Sequential Best Integer-Equivariant Estimation for Geodetic Network Solutions. In: Proc. of ION ITM, ION, San Diego, CA, USA, pp. 31 ⁄ 317.
Brown RG, Hwang PYC (2012) Introduction to Random Signals and Applied Kalman Filtering.
Bryson AE, Henrikson LJ (1968) Estimation Using Sampled Data Containing Sequentially Correlated Noise. Journal of Spacecraft and Rockets 5(6): 66 ⁄ 665.
Search Report from the European Patent Office for application No. 17193912.7 dated Mar. 22, 2018 (11 pages).
Ge M, Gendt G, Rothacher M, Shi C, Liu J (2008) Resolution of GPS carrier-phase ambiguities in Precise Point Positioning (PPP) with daily observations. Journal of Geodesy 82:38✚ 399.
Henkel P., Psychas D., Günther C. (2017) Satellite Phase Bias Estimation with Global Networks and High-Dimensional Integer Ambiguity Fixing. 30th International Technical Meeting of the Satellite Division of the Institute of Navigation (ION GNSS+ 2017), Portland, Oregon, Sep. 25-29, 2017, pp. 3985-3996.
Henkel P., Psychas D., Günther C., Hugentobler U. (2018) Estimation of satellite position, clock and phase bias corrections. Journal of Geodesy 92:1199-1217.
Henkel P, Mittmann U, Iafrancesco M (2016) Real-time Kinematic Positioning with GPS and GLONASS. In: Proc. of 24th European Signal Processing Conference (EUSIPCO), IEEE, Budapest, Hungary, pp ⁄ 5.
Dach R, Hugentobler U, Fridez P, Meindl M (2007) Bernese GPS Software Version 5.0, User manual. Astronomical Institute, University of Bern, Switzerland.

Written Opinion and International Search Report for application No. PCT/EP2018/076182 dated Dec. 19, 2018 (13 pages).
Kouba J, Héroux P (2000) GPS Precise Point Positioning using IGS orbit products. GPS Solutions 5:1 ⁄ 28.
Laurichesse D, Mercier F, Berthias JP (2010) Real-time PPP with undifferenced integer ambiguity resolution, experimental results. In: Proc. of 23rd ION GNSS, ION, Portland, Oregon, USA, pp. 253✓ 2544.
Li X, Ge M, Dousa J, Wickert J (2014) Real time precise point positioning regional augmentation for large GPS reference networks. GPS Solutions 19 pp. 61-71.
Montenbruck O, Steigenberger P, Prange L, Deng Z, Zhao Q, Perosanz F, Romero I, Noll C, Stürze A, Weber G, Schmid R, MacLeod K, Schaer S (2016) The Multi-GNSS Experiment (MGEX) of the International GNSS Service (IGS) Achievements, Prospects and Challenges. Advances in Space Research 59(7):167 ⁄ 1697.
Psychas D. (Published after Sep. 28, 2017) Estimation of GNSS satellite phase biases using a global network of reference stations. Master Thesis, Institute for Communications and Navigation, Technische Universität München, Germany.
Rademakers Erwin et al: "Obtaining real-time sub-meter accuracy using a low cost GNSS device", 2016 European Navigation Conference (ENC), IEEE, May 30, 2016 (May 30, 2016), pp. 1-8, XP032935312, 001: 10.1109/EURONAV.2016 AV.7530555.
Seepersad G et al: "Examining the Interoperability of PPP-AR Products", GNSS 2015—Proceedings of the 28th International Technical Meeting of the Satellite Division of the In-Stitute of Navigation (ION GNSS+ 2015), The Institute of Navigation, 8551 Rixlew Lanesuite 360Manassas, VA 20109, USA, Sep. 18, 2015 (Sep. 18, 2015), pp. 2845-2857, XP056011055.
Teunissen PJG (1995) The least-squares ambiguity decorrelation adjustment: a method for fast GPS ambiguity estimation. Journal of Geodesy 70:6 ✕ 82.
Teunissen PJG (1998) Success probability of integer GPS ambiguity rounding and bootstrapping. Journal of Geodesy 72:60 ✕ 612.
Wen Z et al: "Satellite Bias Determination with Global Station Network and Best-Integer Equivariant Estimation", GNSS 2012—Proceedings of the 25th International Technical Meeting of the Satellite Division of the Institute of Navigation (ION GNSS 2012), The Insti-Tute of Navigation, 8551 Rixlew Lane Suite 360 Manassas, VA 20109, USA, Sep. 21, 2012 (Sep. 21, 2012), pp. 3675-3682, XP056008647.
Wen Z, Henkel P, Günther C (2011) Reliable Estimation of Phase Biases of GPS Satellites with a Local Reference Network. In: Proc. of 53rd Int. IEEE Symp. ELMAR, IEEE, Zadar, Croatia, pp. 32 ⁄ 324.
Zumberge JF, Heflin MB, Jefferson DC, Watkins MM, Webb FH (1997) Precise Point Positioning for the efficient and robust analysis of GPS data from large networks. J of Geophysical Research 102:500 ✕ 5017.

* cited by examiner (a) Single-cluster orbit corrections (b) Multi-cluster orbit corrections (c) Single-cluster satellite clock offsets (d) Multi-cluster satellite clock offsets (e) Single-cluster satellite phase biases (f) Multi-cluster satellite phase biases (a) Single-cluster orbit corrections (b) Multi-cluster orbit corrections (c) Single-cluster satellite clock offsets (d) Multi-cluster satellite clock offsets (e) Single-cluster satellite phase biases (f) Multi-cluster satellite phase biases

METHOD FOR PRECISE POINT POSITIONING IN A SATELLITE NAVIGATION SYSTEM

This application is a National Phase entry of International Patent Application No. PCT/EP2018/076182, filed on Sep. 26, 2018, which claims priority from European Patent Office (EPO) Patent Application No. 17193912.7, filed on Sep. 28, 2017.

FIELD OF THE INVENTION

The invention relates to a method for Precise Point Positioning in a satellite navigation system comprising a plurality of navigations satellites and a plurality of base stations each provided with a receiver that receives satellite signals and is used for determining ambiguity-free phase biases and further instrumental and atmospheric errors wherein the errors are arranged for being transmitted to navigation devices and arranged for being used by the navigation devices for performing Precise Point Positioning including ambiguity fixing, the method comprising the steps:
  obtaining code and phase measurements which were performed on the satellite signals by the plurality of receivers at two or more frequencies,
  determining separate individual values for a plurality of phase ambiguities and a plurality of the errors based on the code and phase measurements.

The invention further relates satellite navigation system, a software product and a navigation device.

BACKGROUND OF THE INVENTION

Precise Point Positioning (PPP) is becoming attractive as the user does not need any raw measurements from a reference station. ZUMBERGE et al. [1] have introduced PPP using precise orbits and docks obtained from a large network of reference stations. KOUBA and HEROUX [2] describe PPP including a precise modeling of satellite antenna offsets, phase wind-up corrections, solid earth tides, ocean loading and earth rotation parameters. They have also assessed the performance using IGS (International GNSS Service) products. Precise satellite orbit and clock information can be obtained by the Bernese software as described by DACH et al. [3].

Precise knowledge of satellite phase biases is required for PPP with integer ambiguity fixing. GE et al. [4] used the Melbourne Wübbena combination and the ionosphere-free phase combination. These combinations were applied to satellite-satellite single difference measurements of 450 IGS (International GNSS Service) stations to estimate the single-difference widelane biases and phase biases. The estimation is performed in two steps, i.e. a first step for the widelane ambiguity fixing, and a subsequent step for fixing the narrowlane ambiguities. The estimated phase biases of [4] vary by only 0.4 cycles per day for some GPS satellites. [4] also shows that their corrections enable a narrowlane (NL) integer ambiguity fixing, i.e. 91% of the float NL ambiguity estimates are deviating by at most 0.1 cycles from the nearest integer.

LAURICHESSE et al. [5] estimated undifferenced satellite phase clocks, station clocks, satellite differential code/phase bias, station differential code/phase biases, station coordinate corrections, satellite orbit corrections and ambiguities in a Kalman filter. They used the same combinations as [4], but processed undifferenced measurements. The assumptions on the process noise statistics are accurately described for each state parameter. [5] analyzed the evolution of the narrowlane pseudorange minus phase biases over the whole year 2008 for all GPS satellites. They distinguished between blocks IIA and IIR satellites and observed a drift of only 3 narrowlane cycles per year.

WEN et al. [6] proposed to estimate the undifferenced satellite phase biases, non-dispersive geometry correction terms including their time derivatives, slant ionospheric delays, and carrier phase ambiguities in a Kalman filter. The ambiguity fixing was triggered based on the stability of the float solution and the statistics of the Kalman filter. The method was applied to the regional network of SAPOS reference stations in Germany.

Carrier phase integer ambiguity fixing is essential for precise satellite phase bias estimates. BLEWITT et al. [7] proposed a sequential ambiguity fixing, which partially exploits the correlation between float ambiguities. The correlation was obtained from a triangular decomposition of the float ambiguity covariance matrix. TEUNISSEN [8] developed the famous Least-squares AMBiguity Decorrelation Adjustment (LAMBDA) method to solve the integer least-squares problem. The LAMBDA method includes an integer decorrelation and a sequential tree search to find the integer ambiguities which minimize the sum of squared ambiguity residuals. TEUNISSEN [9] provides an expression for the success rate of integer bootstrapping based on the cumulative Gaussian distribution.

BRACK et al [10] proposed a sequential Best-Integer Equivariant (BIE) estimator for high-dimensional integer ambiguity fixing. The authors performed one-dimensional searches instead of one-dimensional search, which is much more efficient. The Sequential BIE was used for satellite phase bias estimation with 20 reference stations.

HENKEL et al. [11] developed an ambiguity transformation for GLONASS double difference carrier phase measurements to enable integer ambiguity fixing for FDMA-modulated signals. The transformation is used for joint ambiguity fixing of GPS and GLONASS.

LI et al. [12] discloses a multi-layer processing scheme for determining correction to be used for PPP. The scheme comprises four layers: In the first layer, precise satellites orbits are obtained by a network solution. The orbits from the first layer will be fixed for the precise clock estimation in the second layer. In the third and fourth layer, uncalibrated phase delays and ionospheric and tropospheric corrections are generated using the orbits and clock estimation derived from the previous layers.

SUMMARY OF THE INVENTION

Proceeding from this related art, the present invention seeks to provide a method that fully exploits the information content obtained from code and phase measurements performed by a global network of receivers. The invention is further based on the object to provide a corresponding network of base station, a software product and a navigation device.

This object is achieved by a method having the features of the independent claim. Advantageous embodiments and refinements are specified in claims dependent thereon.

In the method for Precise Point Positioning,
  the receivers are grouped into clusters,
  in each cluster, a determination of a single cluster solution is performed, in which satellite errors selected from the group of satellite position errors, satellite clock errors and satellite phase biases are determined based on the phase and code measurements performed by the receivers of the respective cluster;

a determination of a multi-cluster solution is performed, in which values of the selected satellite errors, which were determined in different clusters are adjusted by an estimation process applied to the values of the selected errors determined in different clusters.

By grouping the receivers into clusters and by processing the measurement first within individual clusters and then in a common estimation process, the whole information content of the phase and code measurements can be used with a moderate computational burden.

In one embodiment, the vector elements of the measurement vector formed for the determination of the single cluster solution are undifferenced and uncombined code and phase measurements. Thus a navigation device of an end user can freely choose the type of processing for determining its position, either by combining measurements or by forming differences of measurements with measurements of a base station that is used as a reference base station.

The determination of the single cluster solution may comprise the following method steps:

the code and phase measurements are used to form a measurement vector, variables for unknown phase ambiguities and unknown errors are mapped into other variables in order to establish a state vector and a full-rank observation matrix between the measurement vector and the state vector, and a recursive state estimator is performed using the observation matrix for estimating values for the variables in each cluster.

The use of a recursive state estimator such as a Kalman filter allows performing a data reduction on a large amount of measurement data and is therefore a suitable tool for the determination of the single cluster solution.

In each cluster, phase ambiguities are determined together with the selected satellite error and an intermediate phase ambiguity fixing is performed while performing the recursive state estimator in order to enhance the speed and/or accuracy of the estimation process.

In each cluster, a temporal reference satellite can be selected among the satellites associated with the cluster, wherein instrumental errors of the satellites associated with the respective cluster are determined as differential errors with respect to the errors of the respective reference satellite. This allows a transformation instead of a re-estimation of the estimated error in case the reference satellite is changed.

In each cluster, a permanent reference receiver can be selected. This allows to map the phase ambiguities into integer double difference ambiguities that can easily be resolved during the estimation process due to their integer nature.

In each cluster, the state vector may comprise a selection of parameters selected from the group including satellite position corrections, receiver and satellite clock errors, tropospheric zenith delays, slant ionospheric delays, receiver and satellite phase biases, and double difference integer ambiguities. This list contains the parameters that affect code and phase measurement. These parameters are typically determined together if they cannot be determined by other means.

The step of determining the single cluster solution may further contain in each cluster the following method steps:

the satellite clock error and satellite code biases are mapped into the receiver clock errors, the phase bias and the phase ambiguities of the reference receiver are mapped to satellite phase biases, and the ambiguities of the reference satellite are mapped to receiver biases.

This type of mapping results in an observation matrix that contain only double difference phase ambiguities, which facilitates the estimation process.

The determination of the multi-cluster solution may comprise the following method steps:

the results obtained for the state vector by performing the determination of a single cluster solution are used to form a composed further measurement vector, variables for phase biases and phase ambiguities to be determined are mapped into other phase biases and phase ambiguities and composed with variables for the selected satellite errors to establish a further state vector and a full-rank observation matrix between the further measurement vector and the further state vector, and values for the variables of the state vector are estimated by a least-square-estimation.

By these method steps a multi-cluster solution for the selected satellite errors can achieved for obtaining a common value for the satellite errors.

The least-square-estimation can be followed by a method step in which the phase ambiguities are fixed, and a further method step, in which the selected satellite error are adjusted in order to increase the accuracy and/or speed of the estimation process.

In the determination of the multi-cluster solution, one of the clusters can be selected as a reference cluster and the further state vector may comprise:

the satellite position errors, satellite clock offsets, which relate to the reference satellite clock errors of the reference cluster and include a differential satellite clock error, that is defined as the difference between the reference satellite clock error of the respective cluster and the satellite clock errors at the reference cluster, satellite phase biases, in which the satellite code biases, the receiver phase and code biases and phase ambiguities of the reference receiver at the reference cluster are mapped, receiver phase biases, in which the receiver phase bias of the reference receiver at the reference cluster and integer ambiguities of the reference receiver at the reference cluster and at any other cluster are mapped, double difference integer ambiguities between the reference receivers at the reference cluster and any other cluster.

Thus the state vector can be separated into a real and an integer part in order to facilitate the estimation process.

For the sake of simplicity the cluster are non-overlapping clusters.

The method may be performed in a network of base stations for a satellite navigation system, the network comprising a plurality of base stations arranged for receiving satellite signals from a plurality of navigation satellites and wherein the network is arranged for determining ambiguity-free phase biases and further instrumental and atmospheric errors wherein the errors are provided for being transmitted to navigation devices and provided for being used by the navigation devices for performing Precise Point Positioning including ambiguity fixing. The computational steps relating to the determination of the single network solution may be performed by a processor associated with the respective cluster or a central processing unit, whereas the computational steps relating to the multi-cluster solution may be performed by a processor associated with a reference cluster, any other cluster or any other central processing unit.

A software product may contain program code for implementing the method if the program code is executed on a processor located at one of the base stations or a central processing unit. Also distributed computing is feasible.

The results obtained by the method may be used by a mobile navigation device for Precise Point Positioning. The navigation device comprises a receiver for receiving satellite navigation signals and a processing unit for processing the satellite navigation signal for obtaining a position of the mobile navigation device, wherein the processing unit is arranged for receiving the errors and for processing the errors for navigation purposes. The navigation may particularly be arranged to choose among suitable combinations of phase and code measurements and between suitable difference with measurements of a reference base station depending on precision requirements and/or environmental conditions such as number of visible satellite, atmospheric conditions and the availability of a reference base station.

BRIEF DESCRIPTION OF THE DRAWINGS

Further advantages and properties of the present invention are disclosed in the following description, in which exemplary embodiments of the present invention are explained in detail based on the drawings.

DETAILED DESCRIPTION OF THE INVENTION

1. Overview

Figure 1:
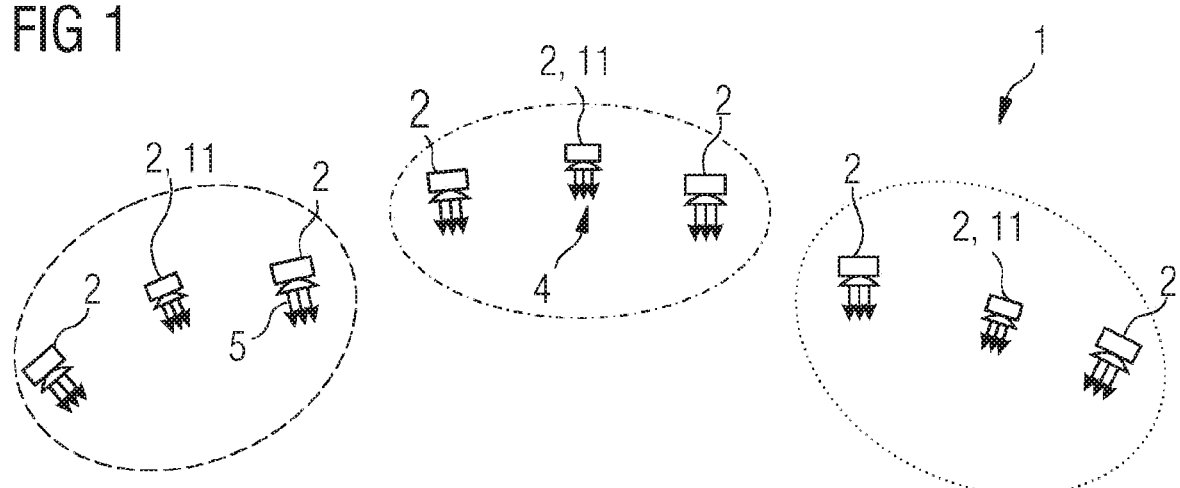
FIG. 1 illustrates a satellite navigation system for PPP comprising clusters of receivers and satellites wherein each cluster includes a reference receiver and a reference satellite and wherein one cluster is a reference cluster.
Figure 1:
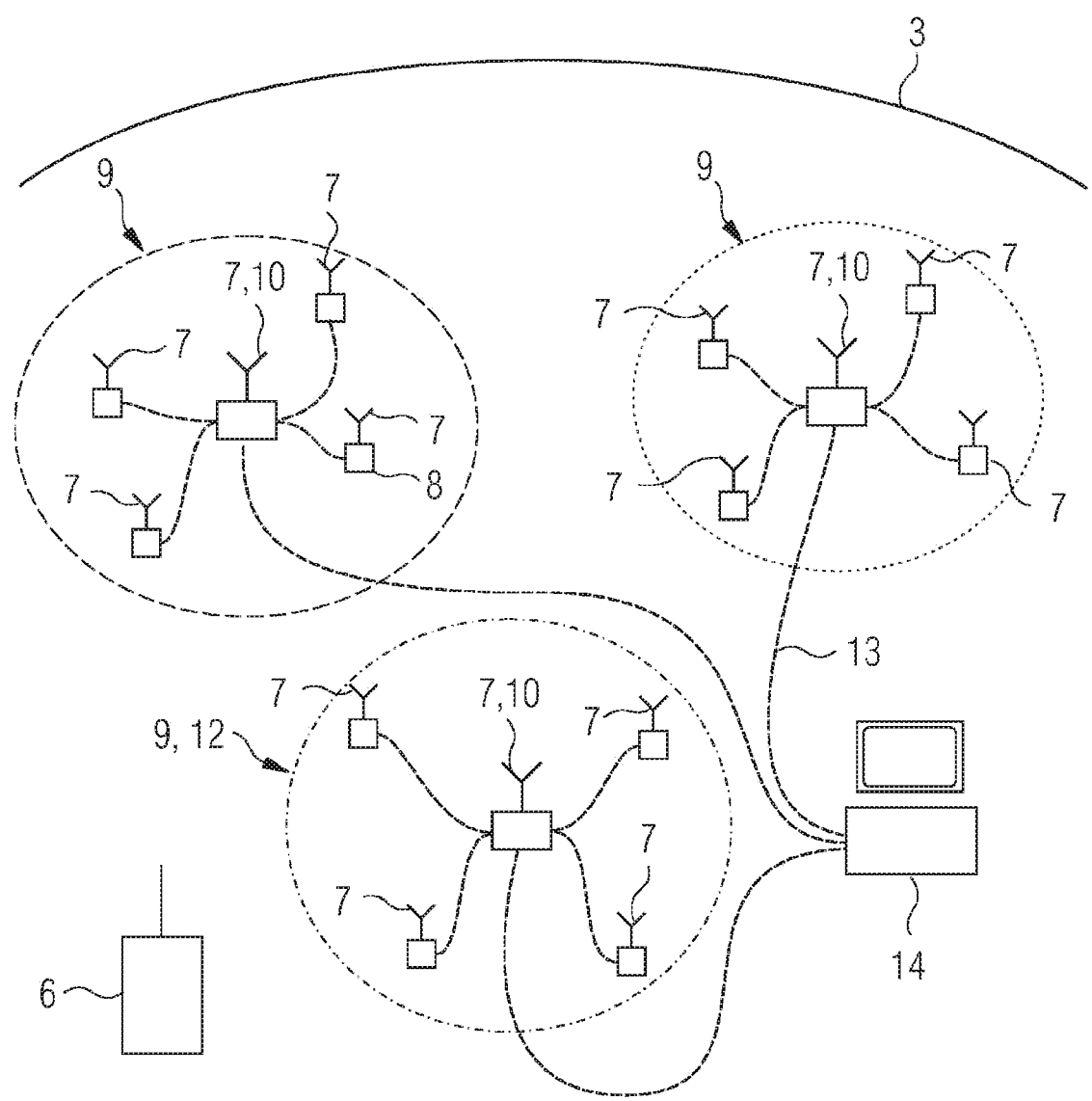

FIG. 1 shows a global navigation satellite system 1 which comprises satellites 2 orbiting around the earth 3 and emitting navigation signals 4 modulated on a number of carriers 5. A end user navigation device 6 uses the navigation signal 4 for determining its position. For Precise Point Positioning, the navigation device 6 must perform code and phase measurements on the navigation signals 4. The phase measurements on the navigation signals 4 are affected by phase ambiguities which needs to be resolved if positioning with high precision is required. If Precise Point Positioning with integer ambiguity resolution is performed by the navigation device 6, the positioning process requires precise knowledge of satellite phase biases, satellite positions and satellite clock corrections.

In the following, a method for the estimation of these parameters with a globally distributed set of receivers 7 is described. The receivers 7 are generally located at base stations 8 distributed over the earth 3. For the method described herein, the receivers 7 are grouped into clusters 9. A reference receiver 10 is selected for each cluster 9. Among the satellites 2, that are visible form the locations of the receivers 7 associated with a particular cluster 9, a reference satellite 11 is selected. The reference satellite 11 is typically a satellite 2 near the zenith at the location of the reference receiver 10. For reasons that will become clear later on, one of the clusters 9 is selected as a reference cluster 12.

In FIG. 1, the satellites 2 that are associated with a particular cluster 9 are encircled by the same type of lign that marks the particular cluster 9.

The base stations 8 form part of a global data network 13. The data network 13 may also comprise a processing unit 14, in which the code and phase measurement performed by the receivers 7 are processed by a software product executed on processors of the processing unit 14 to determine ambiguity-free phase biases and further instrumental and atmospheric errors. These errors are transmitted to the navigation device 6, for instance via the navigation signals 4 of the satellites 2, and used to correct the phase and code measurements of the navigation device 6 so that the navigation device 6 can perform Precise Point Positioning including ambiguity fixing.

Since the satellites 2 continuously change their position, the receivers 7 will receive navigation signals from most satellites 2 over time. In spite of the large number of code and phase measurements acquired by the receivers 7, the satellite phase biases, satellite position and satellite clock corrections can not be determined for all type of measurements that might be performed by various navigation devices 6, due to the high computational burden for resolving all possible phase ambiguities that might needed for a particular type of positioning.

The method described hereafter processes uncombined and undifferenced measurements of an arbitrary number of frequencies such that the obtained orbit, clock and bias corrections can be used for any type of differenced and/or combined measurements.

Figure 2:
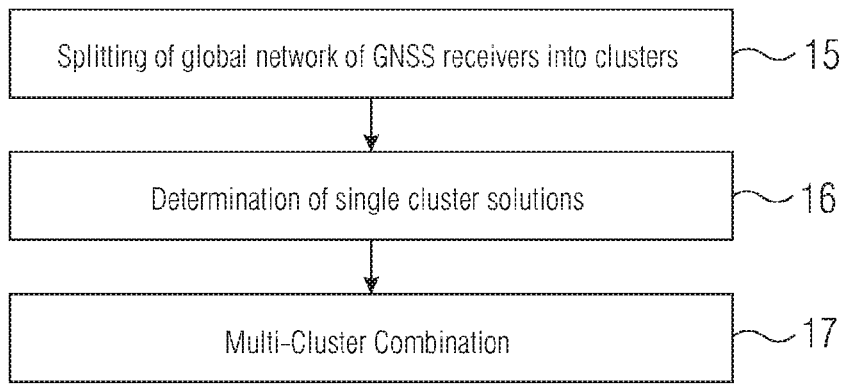
FIG. 2 is a flow chart showing the main sections of the method.

The method further uses the global network 13 of base stations 8 and consists of three main steps as shown in FIG. 2.

The first step includes a splitting 15 of the global network 13 into the clusters 9. The second step includes a determination 16 of a single cluster solution. The determination 16 is generally based on a separate processing of the same combinations of measurements in all clusters 9, in particular by a separate processing of undifferenced and uncombined measurements of each cluster 9. The third step includes the combination of the individual solutions in a multi-cluster solution 17.

Figure 3:
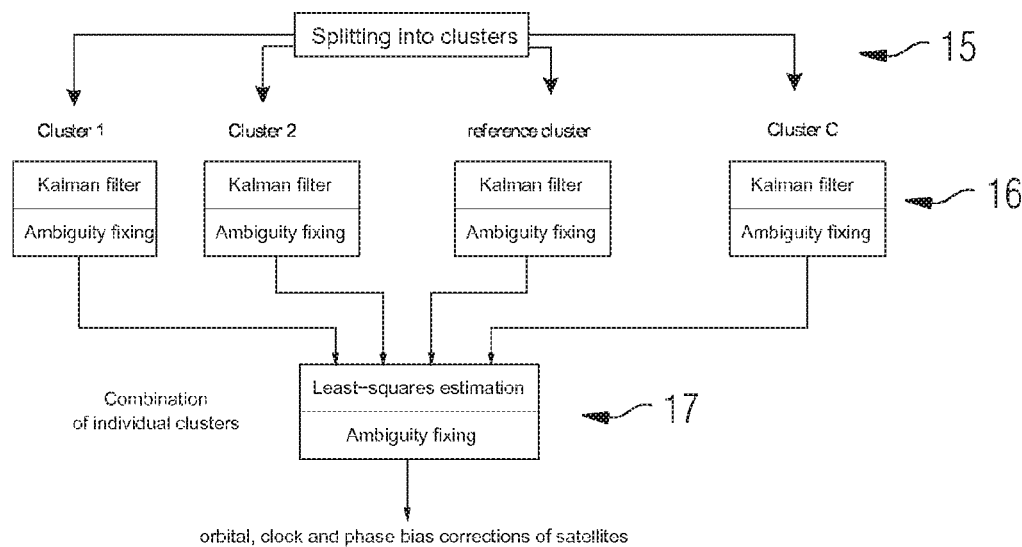
FIG. 3 is a functional diagram of a method for satellite phase bias estimation with clustering of global network.

FIG. 3 shows more details of the method. The determination 16 of a single cluster solution comprises the use of a Kalman filter with intermediate ambiguity fixing, wherein the phase and codes measurements performed by the receivers 7 of individual clusters 9 are processed to determine local values for the satellite phase biases, satellite positions and satellite clock corrections. Since all satellites 2 pass over nearly all clusters, local values for these satellite errors can be obtained for nearly all satellites. The local values are combined in the multi-cluster solution 17, where final values for these satellite errors are estimated, for example by performing a least-square estimation of the final values. In this step and in the context of the Kalman filter ambiguity fixing can be helpful for enhancing the speed and/or the accuracy of the process.

Figure 4:
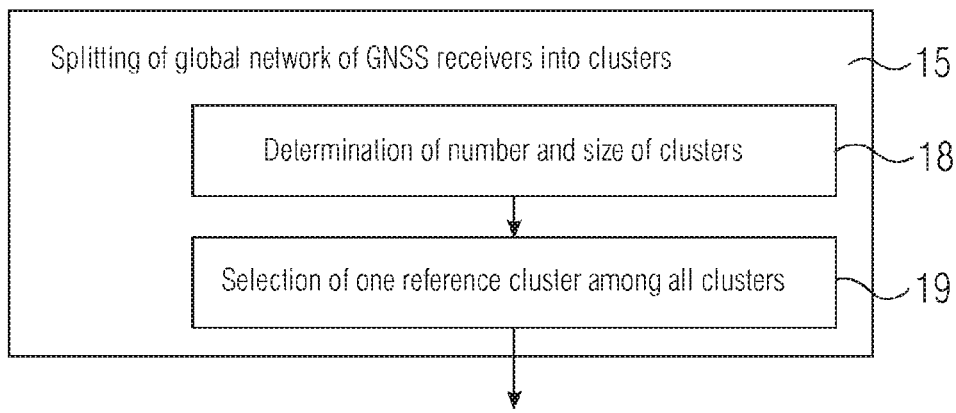
FIG. 4 is a flow chart depicting a preparatory section of the method.

FIG. 4 depicts the splitting 15 into the clusters 9, which constitutes preparatory work for the determination of the errors. In a first step, a determination 18 of the number and size of the clusters 9 is performed. For the sake of simplicity, only non-overlapping clusters 9 are considered. The optimum size of the clusters 9 depends on the geographical distribution of the base stations 8. A large cluster size provides more measurements related to a certain satellite 2, which improves the accuracy of the respective clock and phase bias estimates. However, there are also two arguments for small to moderate cluster sizes: First, an integer ambiguity decorrelation is only feasible with small to moderate cluster size. Secondly, the joint visibility between a reference receiver 10 and any other receiver 7 of the cluster 9 reduces with the cluster size. Thus, the optimum cluster size is a trade-off between maximizing the number of measurements and maximizing common satellite visibility. In a second step, the reference receiver 10 for each cluster 9 is determined by a selection 19.

Figure 5:
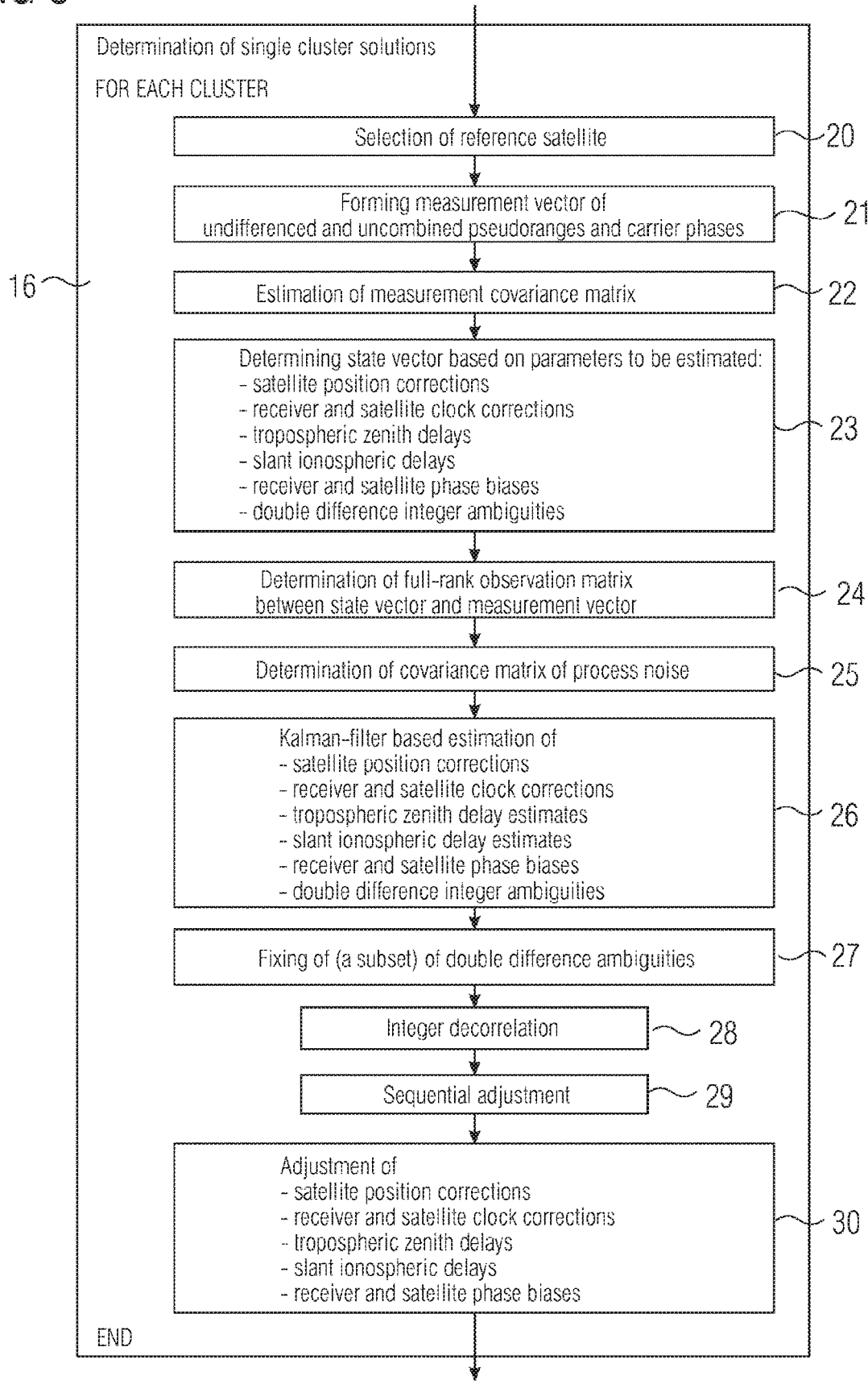
FIG. 5 is a flow chart showing a section of the method relating separately to each cluster.

FIG. 5 is a flow diagram depicting more details on the method steps performed during the determination 16 of the single cluster solution. The determination 16 of the single cluster solution starts with a selection 20 of the reference satellite 11. This step is followed by forming 21 a measurement vector that is composed if undifferenced und uncombined pseudoranges and carrier phases that are based on code and phase measurements by the receivers 7 in the respective cluster 9, followed by a estimation 22 of the measurement covariance matrix and a determination 23 of a state vector based on parameters to be estimated, for instance the satellite position errors, the receiver and satellite clock errors, the tropospheric zenith delays, slant ionospheric delays, the receiver and satellite phase biases and double difference integer ambiguities. Mapping some of these parameters into other parameters is used for the determination 24 of a full rank observation matrix relating the state vector with the measurement vector. A determination 25 of a covariance matrix of the matrix of the process noise is followed by a Kalman-filter based estimation 26 of the above mentioned parameters such as the satellite position errors, the receiver and satellite dock errors, the tropospheric zenith delays, slant ionospheric delays, the receiver and satellite phase biases and double difference integer ambiguities.

The estimation process can be accelerated and its accuracy can be improved by an intermediate ambiguity fixing 27, in which at least a subset of the double difference ambiguities is fixed. In view of the large number of ambiguities an integer decorrelation 28 for high-dimensional ambiguity fixing within dense global networks is used. After each ambiguity fixing a sequential adjustment 29 of the parameters is performed until a final adjustment 30 of the parameters is achieved that is executed after the ambiguity fixing 27 has been completed. The determination 16 of the single cluster solution is performed at a time period ranging from 1 min to 6 hours, typically every 2 hours.

Figure 6:
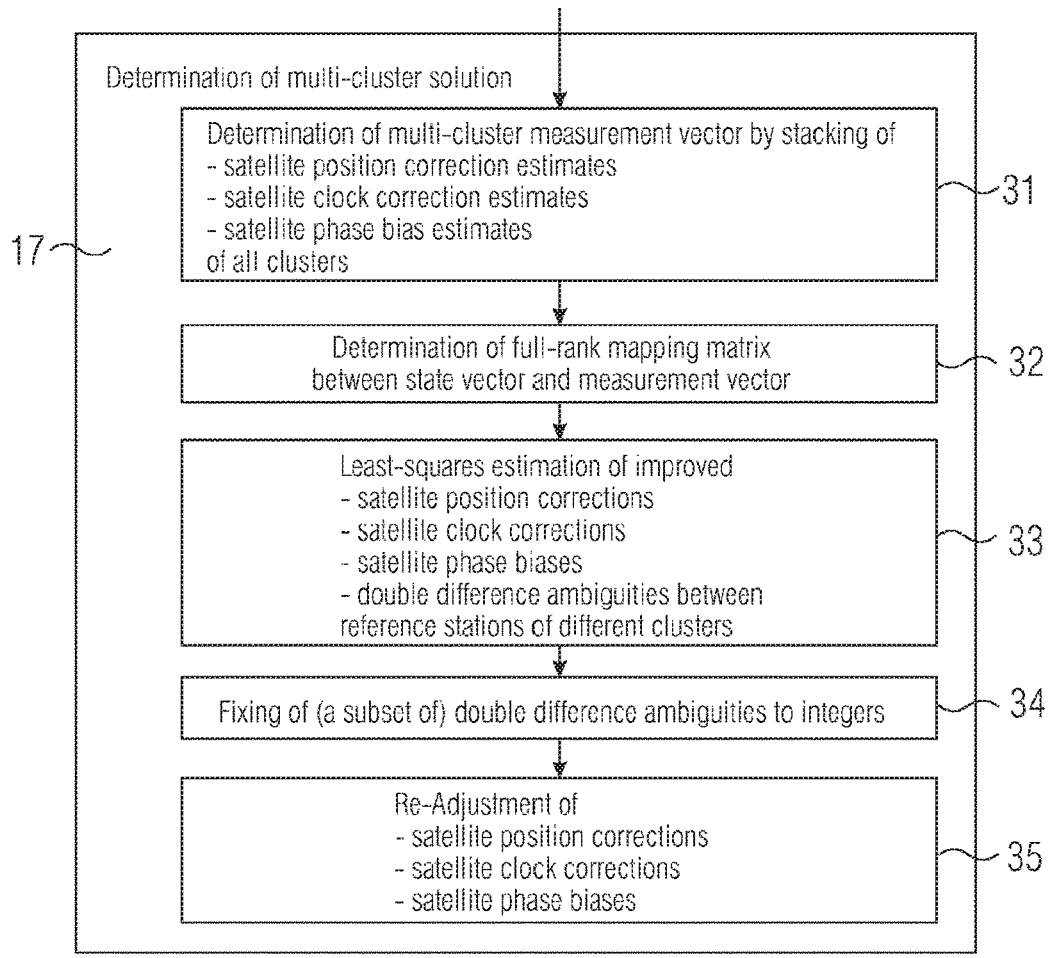
FIG. 6 is a flow chart showing a section relating to all clusters.

The results of the determination 16 of the single cluster solution is further processed by the determination 17 of the multi-cluster solution that is depicted in more detail in FIG. 6. The further processing starts with a determination 31 of a multi-cluster measurements vector, that is composed of the results obtained by the determination 16 of the single cluster solution, in particular the satellite position corrections estimates, satellite dock corrections estimates and the satellite phase biases estimates of all clusters. The multi-cluster state vector is formed by relating some of the searched satellite parameters to the corresponding parameters of the reference cluster 12 and by using the fact that some satellites 2 can be observed from the reference receiver 10 of the reference cluster 12 and the reference receiver 7 of another cluster 9 resulting in integer double difference phase ambiguities. Thus a determination 32 of a full-rank multi-cluster observation matrix between a multi-cluster state vector and the multi-cluster measurement vector can be achieved.

By a least-square estimation 33, improved values for the satellite position corrections estimates, satellite clock corrections estimates, the satellite phase biases estimates and double difference ambiguities are obtained. Fixing 34 at least a subset of the double difference ambiguities can improve the accuracy of the estimation and thus enables a final adjustment 35 of the satellite position errors, the satellite clock errors and the satellite phase biases.

The clustering allows to determine satellite errors based on the measurements performed by all receivers 7. The clustering also enables a common satellite visibility within each cluster and an efficient fixing of the double difference ambiguities within each cluster 9. Additionally, the double difference ambiguities between the receivers 7 of different clusters 9 can be taken into account and fixed.

In summary, the global receiver network 13 is separated into the clusters 9 for the following reasons:

the selection of the common reference satellite 11 and the common reference receiver 10 for all measurements within a particular cluster 9 is only feasible with regional coverage common visibility at the reference receiver 10 and any other receiver 7 within a cluster 9 enables relationship between real-valued undifferenced ambiguity/phase biases using double difference integer ambiguities reduced dimensions of measurements and states within each cluster 9 enables integer ambiguity decorrelation and fixing the selection of the receiver-independent reference satellite 10 enables transformation instead of re-estimation of receiver and satellite dock offsets, receiver phase biases and double difference integer ambiguities in case of changing reference satellite 10

Figure 7:
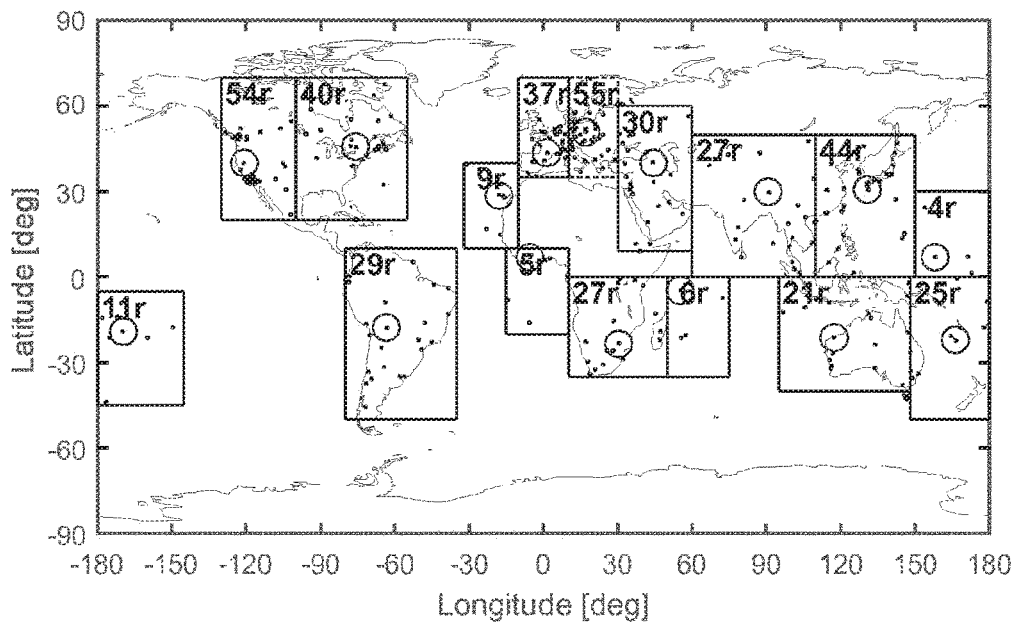
FIG. 7 shows the global network of IGS stations, split into clusters centered around the densest areas of reference stations.

The performance of the proposed method was analyzed with both simulated Galileo measurements on E1 and E5a and real GPS measurements of the IGS network. FIG. 7 shows a map with the locations of the 424 IGS stations. The selected 16 clusters are centered around the densest areas of receivers. The satellite position, clock and phase bias corrections were obtained with an accuracy of better than 2 cm.

2. Measurement Model

In this section, the measurement model for uncombined and undifferenced carrier phase and pseudorange observations is provided. The carrier phase measured at receiver $r \in \{1, \ldots, R\}$ on frequency $m = \{1, \ldots, M\}$ of satellite $k = \{1, \ldots, K\}$ is modeled as $$\lambda_m \varphi_{r,m}{}^k = (\vec{e}_r{}^k)^T((\vec{x}_r + \Delta\vec{x}_{ET,r}) - (\vec{x}_r{}^k + \Delta\vec{x}^k)) + c(\delta\tau_r - (\delta\tau^k + \Delta\delta\tau^k))$$

$$+ m_T(E_r{}^k)T_{z,r} - q_{1m}{}^2 I_{r,1}{}^k$$

$$+ \lambda_m(\Delta\varphi_{PW,r,m}{}^k + \Delta\varphi_{PCO,r,m}{}^k + \Delta\varphi_{PCV,r,m}{}^k)$$

$$+ \lambda_m(N_{r,m}{}^k + \beta_{r,m} - \beta_m{}^k) + \varepsilon_{r,m}{}^k \forall r,m,k, \quad (1)$$

with the wavelength $\lambda_m$, the carrier phase measurement $\mu_{r,m}{}^k$ in units of cycles, the line of sight vector $\vec{e}_r{}^k$ pointing from the satellite to the receiver, the estimated positions $\vec{x}_r$ and $\vec{x}_r{}^k$ of the receiver and satellite, the Earth tides $\Delta\vec{x}_{ET,r}$, the correction $\Delta\vec{x}^k$ of the estimated satellite position, the speed of light c, the estimated dock offsets $\beta\tau_r$ and $\delta\tau^k$ of the receiver and satellite, the correction $\Delta\delta\tau^k$ of the estimated satellite clock offset, the tropospheric mapping function $m_T$ depending on the elevation angle $E_r{}^k$, the tropospheric zenith delay $T_{z,r}$, the ratio of frequencies $q_{1m} = f_1/f_m$, the ionospheric slant delay $I_{r,1}{}^k$ on $f_1$, the phase wind-up $\Delta\varphi_{PW,r,m}{}^k$, the antenna phase center offset $\Delta\varphi_{PCO,r,m}{}^k$ and variation $\Delta\varphi_{PCV,r,m}{}^k$, the integer ambiguity $N_{r,m}{}^k$, the receiver and satellite phase biases $\beta_{r,m}$ and $\beta_m{}^k$ in units of cycles, and the phase noise $\varepsilon_{r,m}{}^k$.

The pseudoranges that are based on code measurements are modeled similarly as:

$$\rho_{r,m}{}^k = (\vec{e}_r{}^k)^T((\vec{x}_r + \Delta\vec{x}_{ET,r}) - (\vec{x}_r{}^k + \Delta\vec{x}^k)) + c(\delta\tau_r - (\delta\tau^k + \Delta\delta\tau^k))$$

$$+ m_T(E_r{}^k)T_{z,r} + q_{1m}{}^2 I_{r,1}{}^k$$

$$+ \lambda_m(\Delta\varphi_{PCO,r,m}{}^k + \Delta\varphi_{PCV,r,m}{}^k)$$

$$+ b_{r,m} - b_m{}^k + \Delta\rho_{MP_{r,m}}{}^k + \eta_{r,m}{}^k \forall r,m,k, \quad (2)$$

with the code biases $b_{r,m}$ and $b_m{}^k$, the pseudorange multipath $\Delta\rho_{MP_{r,m}}{}^k$ and the pseudorange noise $\eta_{r,m}{}^k$.

The raw carrier phases are corrected for the known parameters of the receivers position, the Earth tides, the estimated satellite position, the phase wind-up, the phase center offset and variation:

$$\lambda_m \tilde{\varphi}_{r,m}{}^k = \lambda_m \varphi_{r,m}{}^k - (\vec{e}_r{}^k)^T((\vec{x}_r + \Delta\vec{x}_{ET,r}) - \vec{x}_r{}^k)$$

$$+ c\delta\tau^k - \lambda_m(\Delta\varphi_{PCO,r}{}^k + \Delta\varphi_{PCV,r}{}^k). \quad (3)$$

Similarly, the pseudoranges are corrected as:

$$\tilde{\rho}_{r,m}{}^k = \rho_{r,m}{}^k - (\vec{e}_r{}^k)^T((\vec{x}_r + \Delta\vec{x}_{ET,r}) - \vec{x}_r{}^k)$$

$$+ c\delta\tau^k - \lambda_m(\Delta\varphi_{PCO,r}{}^k + \Delta\varphi_{PCV,r}{}^k). \quad (4)$$

3. Parameter Mapping

In this section, a parameter mapping is introduced that (a) combines some of the above parameters to enable a full-rank system of observation equations and (b) combines ambiguities mainly with ambiguities to preserve the integer property of ambiguities. The mapping requires the selection of a reference receiver 10 and reference satellite 11 being denoted by the lower/upper index ref. As the reference receiver 10 and reference satellite 11 are cluster dependent, the index $c = \{1, \ldots, C\}$ is introduced to denote all cluster dependent parameters.

The rank-defect of the absolute clock offset estimation is prevented by mapping the satellite clock offset of the reference satellite ref of cluster c to the receiver clock offset, i.e.

$$\delta\tilde{\tau}_{r,c} := \delta\tau_r - \Delta\delta\tau^{ref,c} \forall r,c. \quad (5)$$

The dock offsets of the other satellites are adjusted respectively:

$$\Delta\delta\tilde{\tau}^{k,c} := \Delta\delta\tau^k - \Delta\delta\tau^{ref,c} \forall k,c. \quad (6)$$

The code biases $b_{r,m}$ and $b_m{}^k$ of the first two frequencies can be mapped to the clock offset and ionospheric delay:

$$\begin{pmatrix} b_{r,1} - b_1^k \\ b_{r,2} - b_2^k \\ b_{r,3} - b_3^k \\ \vdots \\ b_{r,M} - b_M^k \end{pmatrix} = \Lambda \begin{pmatrix} b_{\delta\tau_r} - b_{\Delta\delta\tau^k} \\ b_{I_r^k} \\ \tilde{b}_{r,3} - \tilde{b}_3^k \\ \vdots \\ \tilde{b}_{r,M} - \tilde{b}_M^k \end{pmatrix}, \quad (7)$$

with $$\Lambda = \begin{pmatrix} 1 & 1 & 0 & \cdots & 0 \\ 1 & q_{12}^2 & 0 & \cdots & 0 \\ 1 & q_{13}^2 & 1 & & 0 \\ \vdots & \vdots & & \ddots & \\ 1 & q_{1M}^2 & 0 & & 1 \end{pmatrix} \quad (8)$$

Solving for the biases of the clock offsets and ionospheric delays gives:

$$\begin{pmatrix} b_{\delta\tau_r} - b_{\Delta\delta\tau^k} \\ b_{I_r^k} \\ \tilde{b}_{r,3} - \tilde{b}_3^k \\ \vdots \\ \tilde{b}_{r,M} - \tilde{b}_M^k \end{pmatrix} = \Lambda^{-1} \cdot \begin{pmatrix} b_{r,1} - b_1^k \\ b_{r,2} - b_2^k \\ b_{r,3} - b_3^k \\ \vdots \\ b_{r,M} - b_M^k \end{pmatrix}. \quad (9)$$

The receiver clock offset is redefined and extended to:

$$\delta\tilde{\tau}_{r,c} := \delta\tau_r - \Delta\delta\tau^{ref,c} + \sum_{m=1}^{M} \gamma_{1m} \cdot (b_{r,m} - b_m^{ref,c}), \quad (10)$$

with $\gamma_{1m}$ being the element of the 1-st row and m-th column of $\Lambda^{-1}$. The satellite clock offsets are adjusted respectively, i.e.

$$\delta\tilde{\tau}^{k,c} := \Delta\delta\tau^k - \Delta\delta\tau^{ref,c} + \sum_{m=1}^{M} \gamma_{1m} \cdot (b_m^k - b_m^{ref,c}). \quad (11)$$

The slant ionospheric delay is adjusted similar as:

$$\tilde{I}_r^k := I_r^k + \sum_{m=1}^{M} \gamma_{2m} \cdot (b_{r,m} - b_m^k), \quad (12)$$

with $\gamma_{2m}$ denoting the element of the 2-nd row and m-th column of $\Lambda^{-1}$.

The estimation of an individual receiver phase bias for each receiver, of an individual satellite phase bias for each satellite, and of an individual integer ambiguity for each link is not feasible due to a rank deficiency. The following parameter mappings is therefore performed to overcome the rank defect:

mapping of phase bias of reference receiver to satellite phase biases mapping of ambiguities of reference receiver to satellite phase biases mapping of ambiguities of reference satellite to receiver phase biases Additionally, the phase biases have to be corrected for the code biases being mapped into the clock offsets and ionospheric delay. Thus, the receiver phase bias with lumped code biases and ambiguities of reference receiver and satellite is given by $$\lambda_m \tilde{\beta}_{r,c,m} := \lambda_m(\beta_{r,m} - \beta_{ref,c,m}) - \sum_{m=1}^{M} \gamma_{1m} \cdot (b_{r,m} - b_{ref,c,m}) + \quad (13)$$

$$\sum_{m=1}^{M} q_{1m}^2 \cdot \gamma_{2m} \cdot (b_{r,m} - b_{ref,c,m}) + \lambda_m(N_{r,m}^{ref,c} - N_{ref,c,m}^{ref,c}) \forall r, c, m.$$

The satellite phase bias is adjusted respectively, i.e.

$$\lambda_m \tilde{\beta}_m^{k,c} := \lambda_m(\beta_m^k - \beta_{ref,c,m}) - \sum_{m=1}^{M} \gamma_{1m} \cdot (b_m^k - b_{ref,c,m}) + \quad (14)$$

$$\sum_{m=1}^{M} q_{1m}^2 \cdot \gamma_{2m} \cdot (b_m^k \, b_{ref,c,m}) - \lambda_m N_{ref,c,m}^k \forall k, c, m.$$

The individual integer ambiguity is related to the integer ambiguity of the reference receiver and reference satellite, which results in the well-known double difference integer ambiguity:

$$\tilde{N}_{r,c,m}^{s_r^{\bar{k}}} := \left(N_{r,m}^{s_r^{\bar{k}}} - N_{r,m}^{ref,c}\right) - \left(N_{ref,c,m}^{s_r^{\bar{k}}} - N_{ref,c,m}^{ref,c}\right) \forall r, c, \bar{k}, \quad (15)$$

where $s_r$ denotes the subset of visible satellites at the $r$-th receiver and $\bar{k}$ is the satellite index within this subset.

The undifferenced carrier phase measurements of Equation (1) can be expressed in terms of the reduced parameter set $\delta\tilde{\tau}_{r,c}$, $\Delta\delta\tilde{\tau}^{k,c}$, $\tilde{\beta}_{r,c,m}$, $\tilde{\beta}_m^{k,c}$ and $\tilde{N}_{r,c,m}^k$. Some parameters vanish and do not have to be estimated for r=ref or $$s_r^{\bar{k}} = ref$$

as shown in Equations (16) and (17).

$$\lambda_m \tilde{\varphi}_{r,m}^k = (\vec{e}_r^k)^T(-\Delta\vec{x}^k) + m_T(E_r^k) \cdot T_{z,r} - q_{1m}^2 \tilde{I}_{r,1}^k + \quad (16)$$

$$\begin{cases} c(\delta\tilde{\tau}_{r,c} - \Delta\delta\tilde{\tau}^{k,c}) + \\ \lambda_m(\tilde{\beta}_{r,c,m} - \tilde{\beta}_m^{k,c} + \tilde{N}_{r,c,m}^k) + \varepsilon_{r,m}^k & r \neq ref, k \neq ref \\ c\delta\tilde{\tau}_{r,c} + \lambda_m(\tilde{\beta}_{r,c,m} - \tilde{\beta}_m^{k,c}) + \varepsilon_{r,m}^k & r \neq ref, k = ref \\ c(\delta\tilde{\tau}_{r,c} - \Delta\delta\tilde{\tau}^{k,c}) - \lambda_m \tilde{\beta}_m^{k,c} + \varepsilon_{r,m}^k & r = ref, k \neq ref \\ c\delta\tilde{\tau}_{r,c} - \lambda_m \tilde{\beta}_m^{k,c} + \varepsilon_{r,m}^k & r = ref, k = ref \end{cases}$$

$$\tilde{\rho}_{r,m}^k = (\vec{e}_r^k)^T(-\Delta\vec{x}^k) + m_T(E_r^k) \cdot T_{z,r} + q_{1m}^2 \tilde{I}_{r,1}^k + \quad (17)$$

$$\begin{cases} c(\delta\tilde{\tau}_{r,c} - \Delta\delta\tilde{\tau}^{k,c}) + \Delta\rho_{MP_{r,m}}^k + \eta_{r,m}^k & r \neq ref, k \neq ref \\ c\delta\tilde{\tau}_{r,c} + \Delta\rho_{MP_{r,m}}^k + \eta_{r,m}^k & r \neq ref, k = ref \\ c(\delta\tilde{\tau}_{r,c} - \Delta\delta\tilde{\tau}^{k,c}) + \Delta\rho_{MP_{r,m}}^k + \eta_{r,m}^k & r = ref, k \neq ref \\ c\delta\tilde{\tau}_{r,c} + \Delta\rho_m^{k,c} + \eta_{r,m}^k & r = ref, k = ref \end{cases}$$

4. Cluster Solution with Kalman Filter

This section describes the estimation of satellite positions, clock offsets and phase biases for an individual cluster.

The corrected carrier phase and pseudorange measurements of all receivers $r \in \{1, \ldots, R\}$ and frequencies $m \in \{1, \ldots, M\}$ in cluster c of a certain epoch are stacked in a column vector, i.e.

$$z = (\lambda_1 \tilde{\varphi}_{1,1}^1, \ldots, \lambda_1 \tilde{\varphi}_{1,1}^K, \ldots, \lambda_1 \tilde{\varphi}_{R,1}^1, \ldots, \lambda_1 \tilde{\varphi}_{1,1}^K,$$
$$\ldots$$
$$\lambda_M \tilde{\varphi}_{1,M}^1, \ldots, \lambda_M \tilde{\varphi}_{1,M}^K, \ldots, \lambda_M \tilde{\varphi}_{R,M}^1, \ldots, \lambda_M \tilde{\varphi}_{R,M}^K,$$
$$\tilde{\rho}_{1,1}^1, \ldots, \tilde{\rho}_{1,1}^K, \ldots, \tilde{\rho}_{R,1}^1, \ldots, \tilde{\rho}_{R,1}^K, \ldots,$$
$$\tilde{\rho}_{1,M}^1, \ldots, \tilde{\rho}_{1,M}^K, \ldots, \tilde{\rho}_{R,M}^1, \ldots, \tilde{\rho}_{R,M}^K)^T. \quad (18)$$

Similarly, all unknowns of cluster c are stacked in the state vector x given by $$x = ((\Delta\vec{x}^1)^T, \ldots, (\Delta\vec{x}^K)^T,$$

$$c\delta\tilde{\tau}_{1,c}, \ldots, c\delta\tilde{\tau}_{R,c}, c\Delta\delta\tilde{\tau}^{1,c}, \ldots, c\Delta\delta\tilde{\tau}^{K,c},$$

$$T^{z,1}, \ldots, T_{z,R},$$

$$\tilde{I}_{1,1}^1, \ldots, \tilde{I}_{1,1}^K, \ldots, \tilde{I}_{R,1}^1, \ldots, \tilde{I}_{R,1}^K,$$

$$\tilde{\beta}_{1,c,1}, \ldots, \tilde{\beta}_{R,c,1}, \ldots, \tilde{\beta}_{1,c,M}, \ldots, \tilde{\beta}_{R,c,M},$$

$$\tilde{\beta}_1^{1,c}, \ldots, \tilde{\beta}_1^{K,c}, \ldots, \tilde{\beta}_M^{1,c}, \ldots, \tilde{\beta}_M^{K,c},$$

$$\tilde{N}_{1,c,1}^1, \ldots, \tilde{N}_{1,c,1}^K, \ldots, \tilde{N}_{R,c,1}^1, \ldots, \tilde{N}_{R,c,1}^K, \ldots,$$

$$\tilde{N}_{1,c,M}^1, \ldots, \tilde{N}_{1,c,M}^K, \ldots, \tilde{N}_{R,c,M}^1, \ldots, \tilde{N}_{R,c,M}^K)^T. \quad (19)$$

As the satellite positions and clock offsets are known from the broadcast orbits with an accuracy of 1 m and 1.5 m and as the order of magnitude of atmospheric errors and satellite phase biases is also known, we introduce some prior knowledge on these state parameters:

$$\bar{x} = ((\Delta \vec{x}^1)^T, \ldots, (\Delta \vec{x}^K)^T,$$

$$\Delta \delta \hat{\tau}^{1,c}, \ldots, \Delta \delta \hat{\tau}^{K,c},$$

$$T^{z,1}, \ldots, T_{z,R},$$

$$\tilde{\beta}_{1,c,1}, \ldots, \tilde{\beta}_{R,c,1}, \ldots, \tilde{\beta}_{1,c,M}, \ldots, \tilde{\beta}_{R,c,M},$$

$$\tilde{\beta}_1^{1,c}, \ldots, \tilde{\beta}_1^{K,c}, \ldots, \tilde{\beta}_M^{1,c}, \ldots, \tilde{\beta}_M^{K,c})^T, \quad (20)$$

with a priori known covariance matrix $\Sigma_{\bar{x}}$.

Both measurements and prior information are linear dependent on the state vector. Thus, $z$ and $\bar{x}$ are combined to $$\begin{pmatrix} z \\ \bar{x} \end{pmatrix} = Hx + \begin{pmatrix} \eta_z \\ \eta_{\bar{x}} \end{pmatrix}, \quad (21)$$

where $\eta_z$ denotes the measurement noise and $\eta_{\bar{x}}$ describes the error of the prior information. It is assumes that both errors can be modeled by white Gaussian noise. Colored noise is precisely modeled in BRYSON and HENRIKSON [13].

A standard Kalman filter (see BROWN and HWANG [14]) is used to estimate x from the extended measurement vector, and denote the resulting state estimate by $\hat{x}^+$. The estimated state vector also includes $$M \cdot \sum_{r=1, r \neq ref}^{R} (K_r - 1) \quad (22)$$

double difference ambiguities. A typical cluster with R=40 dual-frequency receivers and an average of 9 visible satellites per receiver results in $2 \cdot (40-1) \cdot (9-1) = 624$ double difference ambiguities. The fixing of a few hundred of ambiguities to integers is computationally demanding. The integer-decorrelation of [8] is still feasible. However, a tree search is no longer feasible for this network size. Therefore, integer-decorrelation and bootstrapping is used for integer fixing.

5. Combination of Clusters

This section describes the combination of the satellite positions, clock offsets and phase bias estimates of all clusters. A multi-cluster solution is used to achieve the following benefits:

satellites being visible from more than one cluster provide multiple correlated satellite position, clock and phase bias estimates a selection of a reference cluster $c_{ref}$ enables the relation of cluster-dependent satellite phase biases to satellite phase biases of the reference cluster and to exploit integer property of double difference ambiguities related to the reference satellite of the reference cluster and any other satellite being jointly visible at reference cluster and any other cluster, and being observed by the reference stations of both clusters.

The satellite position correction obtained from the Kalman filter of the c-th cluster can be related to the true satellite position correction:

$$(\Delta \hat{\vec{x}}^{k,c})^+ = \Delta \vec{x}^k + \eta_{\Delta \vec{x}^{k,c}}, \quad (23)$$

where the true position is cluster-independent and $\eta_{\Delta \vec{x}^{k,c}}$ denotes the error of the estimate.

The estimates of the cluster-dependent satellite clock offsets of Equation (6) are related to the satellite clock offsets of the reference cluster and differential (cluster to reference cluster) satellite clock offsets, i.e.

$$\left(\Delta \delta \hat{\tau}^{k,c}\right)^+ := \Delta \delta \tau^k - \Delta \delta \tau^{ref,c} + \eta_{\Delta \delta \hat{\tau}^{k,c}}$$

$$= \Delta \delta \tau^k - \Delta \delta \tau^{ref,c_{ref}} - \left(\Delta \delta \tau^{ref,c} - \Delta \delta \tau^{ref,c_{ref}}\right) + \eta_{\Delta \delta \hat{\tau}^{k,c}}$$

The estimates of the satellite phase biases $\tilde{\beta}_m^{k,c}$ of Equation (14) include satellite and/or constellation-dependent parameters. Therefore, the satellite phase bias estimates is rewritten as $$\left(\lambda_m \hat{\tilde{\beta}}_m^{k,c}\right)^+ = u(k, m) + v(c, m) + w(k, c, m) + \eta_{\lambda_m \tilde{\beta}_m^{k,c}}, \quad (24)$$

with $$u(k, m) = \lambda_m \beta_m^k - \sum_{m=1}^{M} (\gamma_{1m} - q_{1m}^2 \gamma_{2m}) b_m^k$$

$$v(c, m) = -\lambda_m \beta_{ref,c,m} + \sum_{m=1}^{M} (\gamma_{1m} - q_{1m}^2 \gamma_{2m}) b_{ref,c,m}$$

$$w(k, c, m) = -\lambda_m N_{ref,c,m}^k. \quad (25)$$

The satellite phase bias estimates of any cluster c can be related to the satellite phase bias estimates of the reference cluster, i.e.

$$\left(\lambda_m \hat{\tilde{\beta}}_m^{k,c}\right)^+ = u(k.m) + v(c_{ref}, m) + w(k, c_{ref}, m) + \quad (26)$$

$$(v(c.m) - v(c_{ref}, m)) + (w(k, c, m) - w(k, c_{ref}, m)) + \eta_{\lambda_m \tilde{\beta}_m^{k,c}}.$$

The first three terms can be combined to $$\tilde{u}(k,m) := u(k,m) + v(c_{ref}, m) + (k, c_{ref}, m), \quad (27)$$

which is of dimension KM. As a separate determination of $\tilde{u}(k,m)$, $v(c,m)$ and $w(k,c,m)$ from $$\left(\lambda_m \hat{\tilde{\beta}}_m^{k,c}\right)^+$$

is not feasible due to rank-deficiency and as the integer property of w(k,c,m) shall be exploited, a satellite k is selected that is visible both at cluster c and cluster $c_{ref}$ as dual-cluster reference satellite (being denoted by $\overline{ref}$), and map the differential ambiguity $$w(\overline{ref}, c, m) - w(\overline{ref}, c_{ref}, m)$$

to v(c,m). Thus, the satellite phase bias estimate is expressed in terms of the reduced parameter set:

$$\left(\lambda_m \hat{\beta}_m^{k,c}\right)^+ = \tilde{u}(k,m) + \tilde{v}(c,m) + \tilde{w}(k,c,m) + \eta_{\lambda_m \hat{\beta}_m^{k,c}}, \quad (28)$$

with $$\tilde{v}(c,m) = v(c,m) - v(c_{ref},m) + \left(w(\overline{ref},c,m) - w(\overline{ref},c_{ref},m)\right) \quad (29)$$

$$\forall c \neq c_{ref}, m \quad (30)$$

$$\tilde{w}(k,c,m) =$$

$$(w(k,c,m) - w(k,c_{ref},m)) - \left(w(\overline{ref},c,m) - w(\overline{ref},c_{ref},m)\right)$$

$$\forall k \neq \overline{ref}, c \neq c_{ref}, m$$

The meaning, dimensions and notation of the reduced parameter set are summarized in Table 1.

The multi-cluster solution of satellite positions, clock offsets and phase biases from the single cluster solutions is obtained by stacking the estimates of all clusters in a column vector $$z = \left(\left(\left(\Delta\hat{x}^{1,1}\right)^+\right)^T, \ldots, \left(\left(\Delta\hat{x}^{K,1}\right)^+\right)^T, \ldots, \left(\left(\Delta\hat{x}^{1,C}\right)^+\right)^T, \ldots, \left(\left(\Delta\hat{x}^{K,C}\right)^+\right)^T, \quad (31)\right.$$

$$\left(\Delta\hat{\delta\tau}^{1,1}\right)^+, \ldots, \left(\Delta\hat{\delta\tau}^{K,1}\right)^+, \ldots, \left(\Delta\hat{\delta\tau}^{1,C}\right)^+, \ldots, \left(\Delta\hat{\delta\tau}^{K,C}\right)^+,$$

$$\left(\lambda_m\hat{\beta}_1^{1,1}\right)^+, \ldots, \left(\lambda_m\hat{\beta}_1^{K,1}\right)^+, \ldots, \left(\lambda_m\hat{\beta}_M^{1,1}\right)^+, \ldots, \left(\lambda_m\hat{\beta}_M^{K,1}\right)^+, \ldots,$$

$$\left.\left(\lambda_m\hat{\beta}_1^{1,C}\right)^+, \ldots, \left(\lambda_m\hat{\beta}_1^{K,C}\right)^+, \ldots, \left(\lambda_m\hat{\beta}_M^{1,C}\right)^+, \ldots, \left(\lambda_m\hat{\beta}_M^{K,C}\right)^+\right)^T$$

The stacked estimates of all clusters are considered as measurements that are linear related to the satellite positions, clock offsets and phase biases, i.e.

$$z = Hx + \eta_z, \quad (32)$$

where the mapping matrix H and the state vector x can be split into a part referring to real-valued states and a part referring to integer-valued states:

$$H = (H_{real}, H_{int}), \quad (33)$$

and $$x = \begin{pmatrix} x_{real} \\ x_{int} \end{pmatrix}, \quad (34)$$

where $x_{real}$ and $x_{int}$ are defined as $$x_{real} = ((\Delta\vec{x}^1)^T, \ldots, (\Delta\vec{x}^K)^T,$$

$$\Delta\delta\tau^1 - \Delta\delta\tau^{ref,cref}, \ldots, \Delta\delta\tau^K - \Delta\delta\tau^{ref,cref},$$

$$\tilde{u}(1,1), \ldots, \tilde{u}(K,1), \ldots, n\tilde{u}(1,M), \ldots, \tilde{u}(K,M),$$

$$\tilde{v}(1,1), \ldots, \tilde{v}(C,1), \ldots, \tilde{v}(1,M), \ldots, \tilde{v}(C,M))^T, \quad (35)$$

and $$x_{int} = (\tilde{w}(1,1,1), \ldots, \tilde{w}(K,1,1), \ldots$$

$$\tilde{w}(1,C,1), \ldots, \tilde{w}(K,C,1), \ldots$$

$$\tilde{w}(1,1,M), \ldots, \tilde{w}(K,1,M), \ldots$$

$$\tilde{w}(1,C,M), \ldots, \tilde{w}(K,C,M))^T. \quad (36)$$

The least-squares solution of x is given by $$\hat{x} = (H^T \Sigma_z^{-1} H)^{-1} H^T \Sigma_z^{-1} z. \quad (37)$$

The number of ambiguities in z is for typical values of K, C and M much larger than the number of satellite positions, clock offsets and phase biases. Therefore, the ambiguity fixing of the multi-cluster combination is very beneficial. The method therefore uses the integer decorrelation of the LAMBDA method of [8] and bootstrapping. The real-valued states $x_{real}$ are re-adjusted after ambiguity fixing as $$\check{x}_{real} = (H_{real}^T \Sigma_z^{-1} H_{real})^{-1} H_{real}^T \Sigma_z^{-1} (z - H_{int} \check{x}_{int}). \quad (38)$$

6. Simulation Results

In this section, the performance of the proposed dual stage multi-cluster based estimation of satellite orbit, clock and phase bias corrections, tropospheric zenith and ionospheric slant delays and integer ambiguities is analyzed. Galileo measurements on the frequencies E1 and E5a of the full Galileo constellation (27 satellites) are simulated for the stations of the global IGS network. The IGS stations are grouped into 16 clusters as shown in FIG. 7. The measurement noise was simulated as white Gaussian noise. In particular, a standard deviation of 2 mm is assumed for the phase noise and of 20 cm for the pseudorange noise. A sampling interval of 100 s was chosen. The process noise of the satellite position errors, receiver and satellite clock offsets, receiver and satellite phase biases, tropospheric zenith delays and ionospheric slant delays was modeled as Gaussian noise with a standard deviation of 1 mm/epoch.

Figure 8:
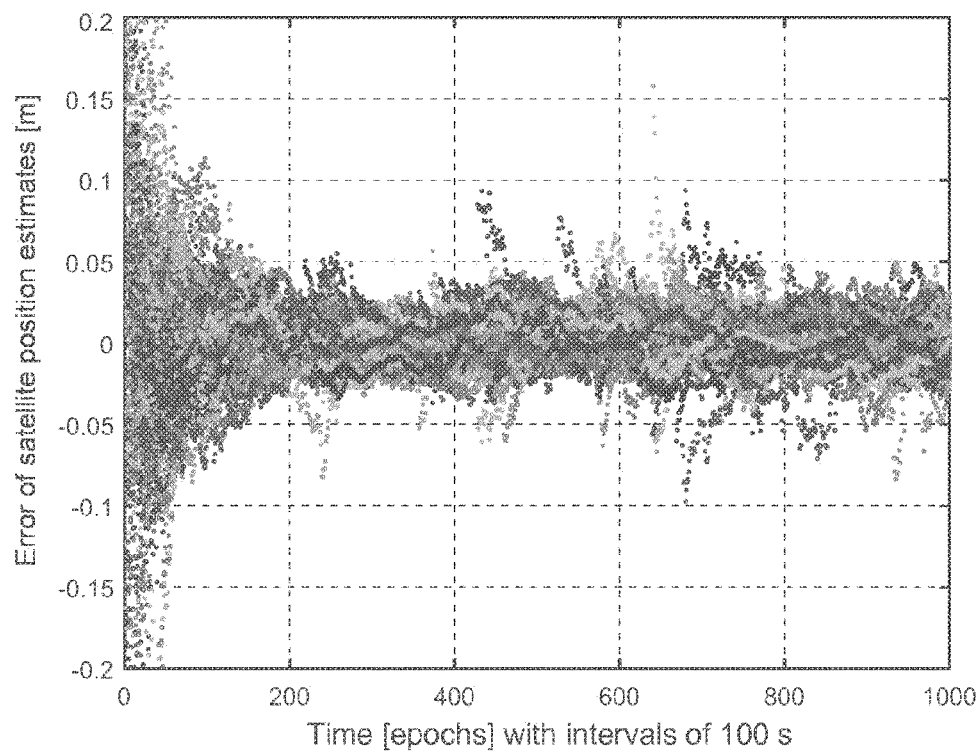
FIG. 8 is a diagram depicting errors of multi-cluster satellite orbit correction estimates with float ambiguities.
Figure 9:
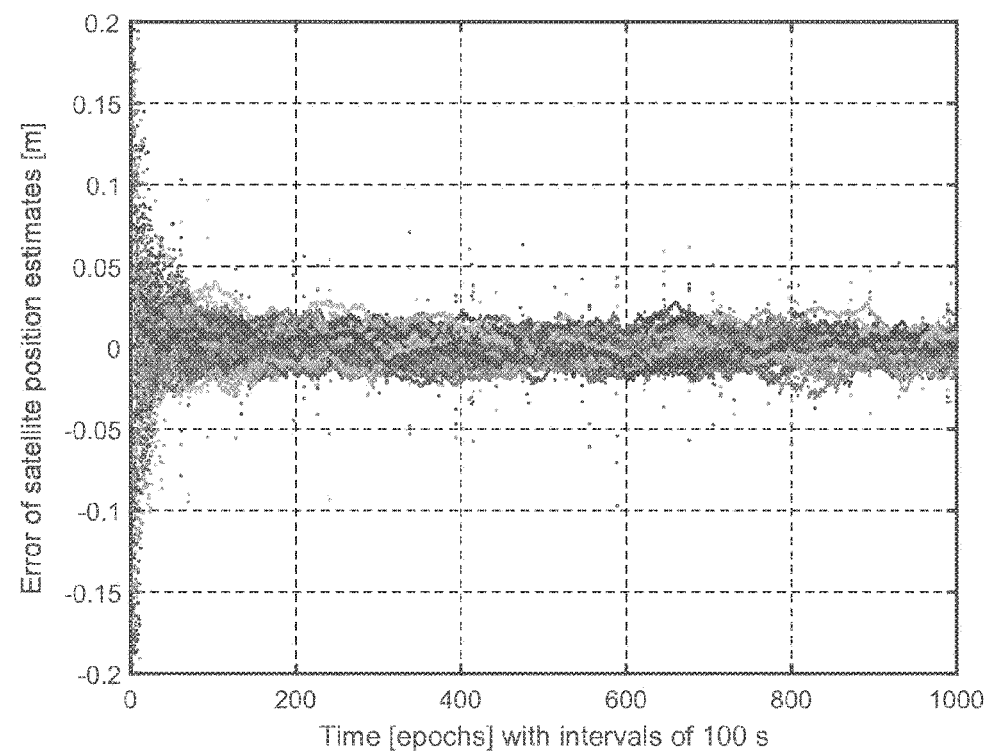
FIG. 9 is a diagram depicting errors of multi-cluster satellite orbit correction estimates with fixed ambiguities.

The convergence of the satellite position corrections of the multi-cluster combination is shown for float ambiguities in FIG. 8 and for fixed ambiguities in FIG. 9. In both figures and also in subsequent figures, different shades of gray refer to different satellites 2. The float solution requires approximately 150 epochs (4 hours) to converge to a level with errors of less than 5 cm. The errors remain for almost all satellites and epochs below this threshold except for a few epochs, where some satellites show a larger error due to weak observability. However, a much faster convergence and higher stability over time can be observed after fixing of the real-valued ambiguity estimates to their integer values. In particular, it can be observed that the accuracy is better than 3 cm for almost all epochs and satellites after the initial convergence. The errors reduce to less than 5 cm within 20 epochs (33 min) and to less than 3 cm within 40 epochs (66 min).

Figure 10:
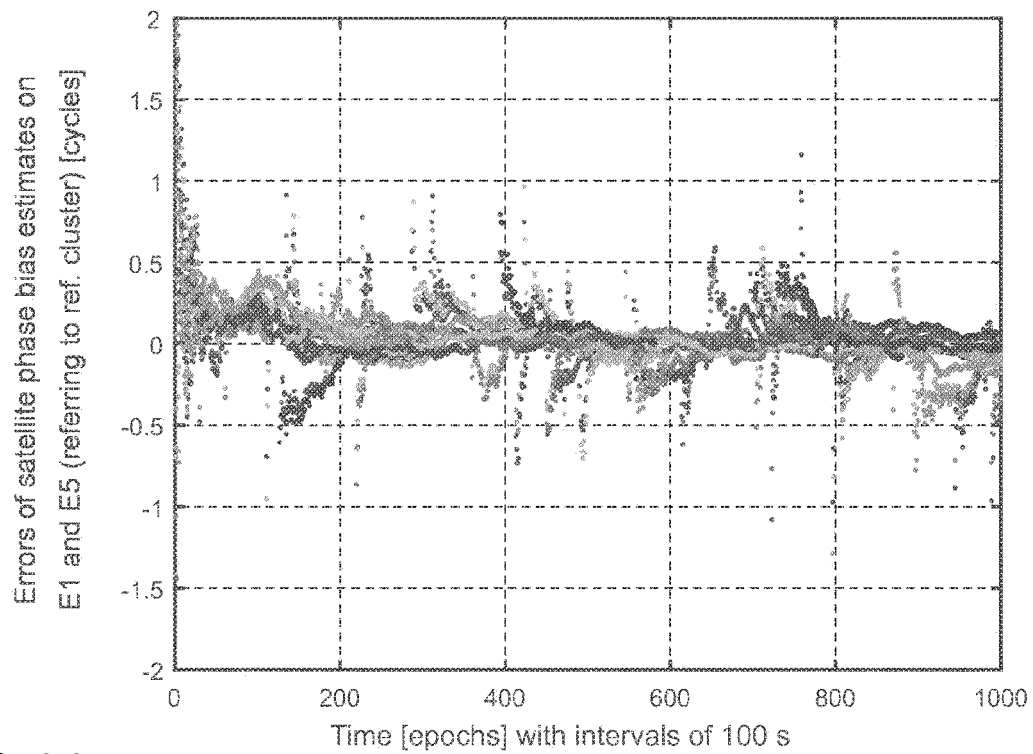
FIG. 10 is a diagram depicting errors of multi-cluster satellite phase bias estimates on E1 and E5a (referring to the reference cluster) with float ambiguities.
Figure 11:
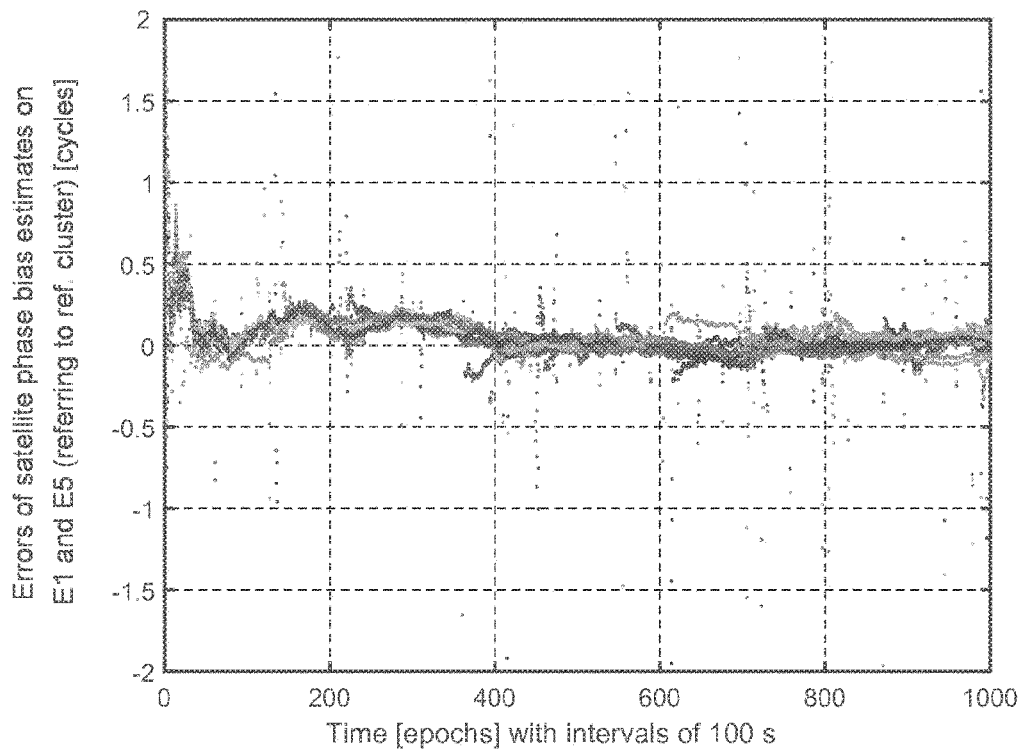
FIG. 11 is a diagram depicting errors of multi-cluster satellite phase bias estimates on E1 and E5a (referring to the reference cluster) with fixed ambiguities.

FIG. 10 shows the accuracy of the satellite phase bias estimates referring to the reference cluster. The errors are below 0.2 cycles (4 cm) for all satellites and epochs except of a few epochs, where some satellites are only weakly observable at the reference cluster. The fixed solution is shown in FIG. 11 and benefits from a lower noise level and higher stability than the float solution. One can also observe a high correlation between the errors of the satellite phase bias estimates from different satellites.

Figure 12:
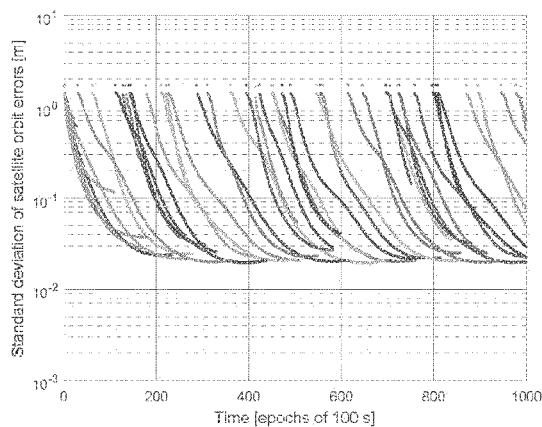
FIG. 12 depicts the benefit in precision of multi-cluster estimation of orbit corrections, satellite dock offsets and phase biases with float ambiguities.
Figure 12:
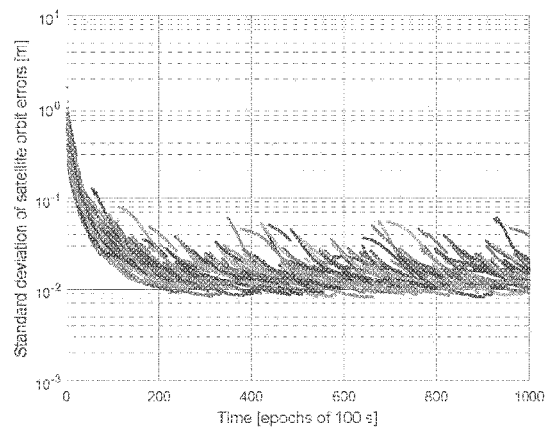
Figure 12:
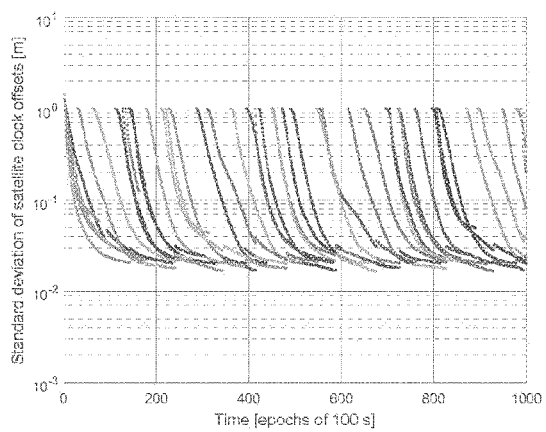
Figure 12:
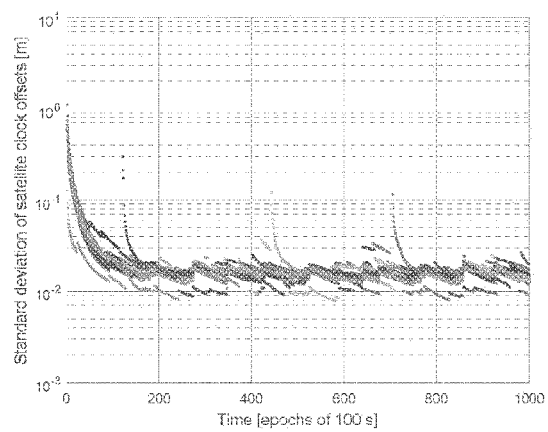
Figure 12:
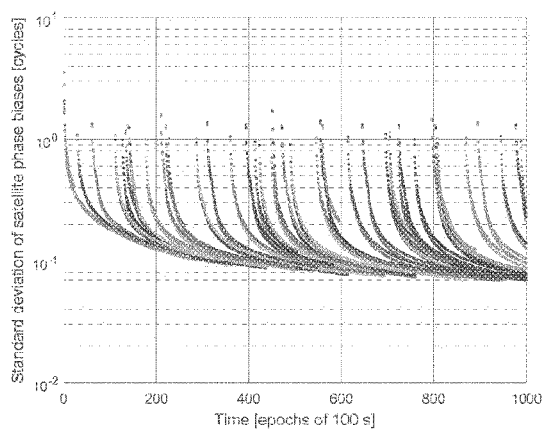
Figure 12:
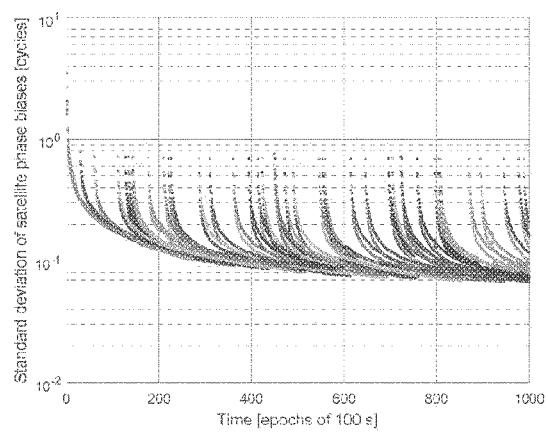
Figure 13:
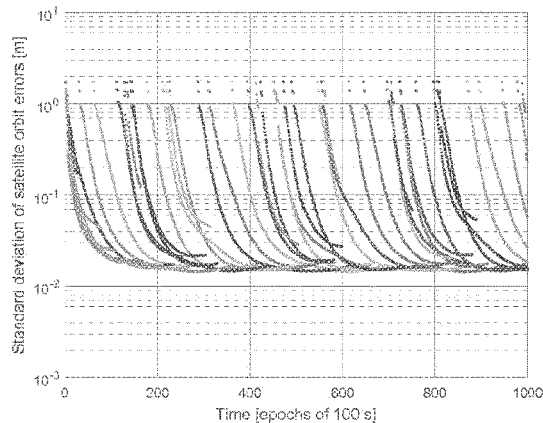
FIG. 13 depicts the benefit in precision of multi-cluster estimation of orbit corrections, satellite dock offsets and phase biases with fixed ambiguities.
Figure 13:
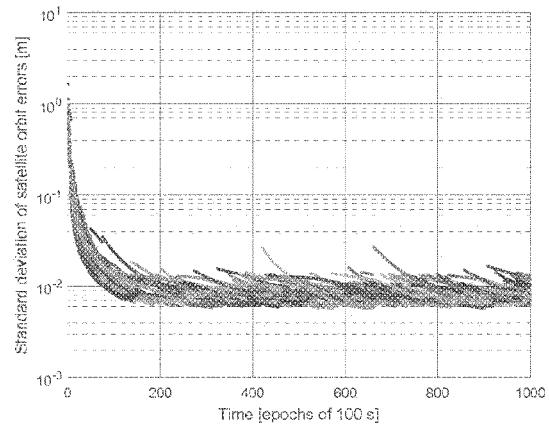
Figure 13:
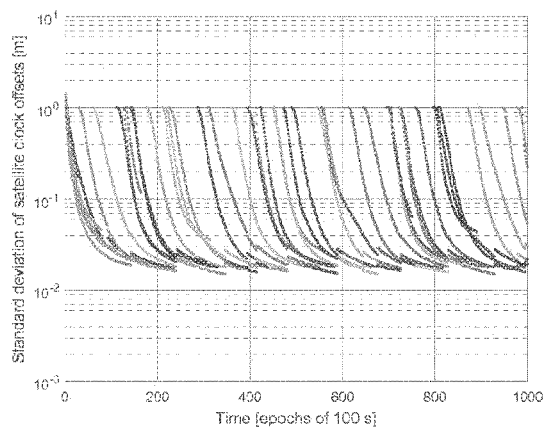
Figure 13:
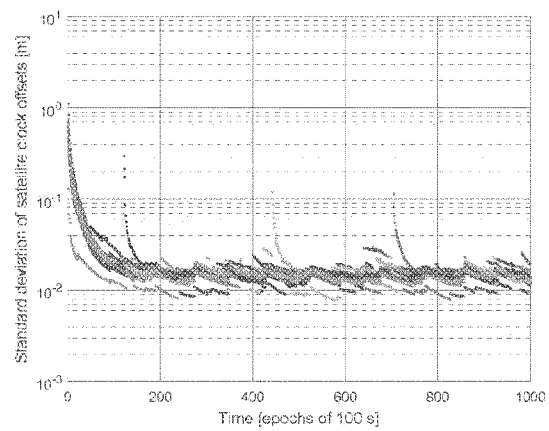
Figure 13:
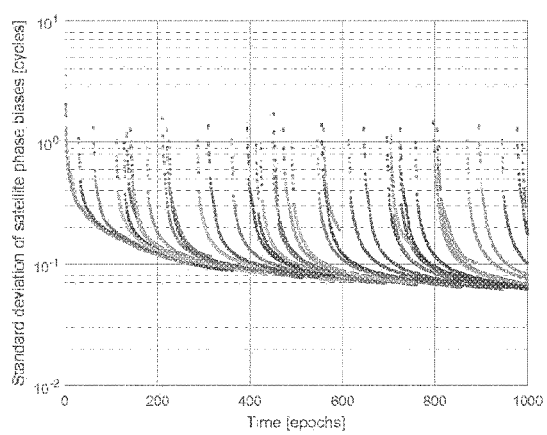
Figure 13:
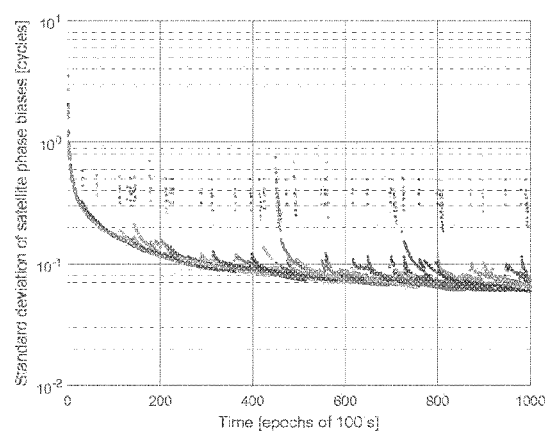
Figure 14:
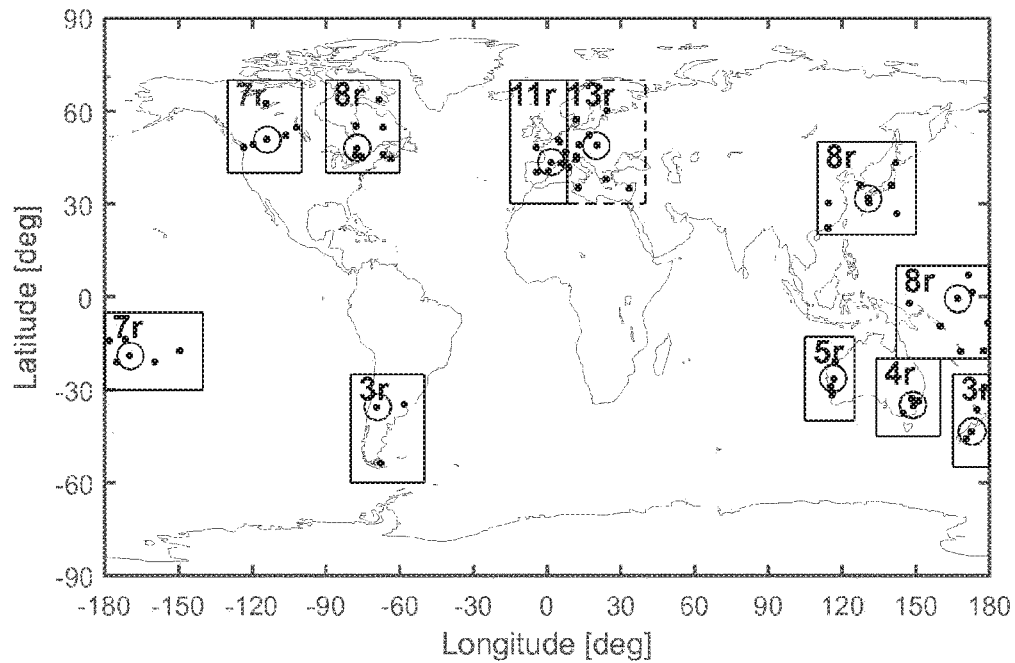
FIG. 14 shows an IGS Multi-GNSS network with 11 clusters.

FIG. 12 shows the benefit in precision of the multi-cluster over the single-cluster solution of satellite orbit corrections, satellite clock offsets and satellite phase biases. The ambiguities were estimated as float values. The subfigures on the left side refer to the single-cluster and those on the right side refer to the multi-cluster solution. Each plotted line refers to a satellite pass.

It can be clearly seen that the single-cluster solution has a poor precision for the parameters related to satellites rising at the edge of the cluster. On the contrary, the multi-cluster solution provides orbit corrections, satellite dock offsets and phase biases with a precision varying between 8 and 50 mm for all satellites and epochs after initial convergence. In addition, a faster convergence and a lower error floor can be observed especially for the orbital and clock errors of the multi-cluster combined solution.

The ambiguity-fixed solution is shown for the same scenario and parameters in FIG. 12. The convergence time is significantly lower for both the single- and multi-cluster solutions. A higher precision is also achieved for the multi-cluster solution of orbit corrections, satellite clock offsets and phase biases with a standard deviation between 5 and 20 mm for all satellites.

7. Real Data Analysis

For validating the proposed estimation of satellite position, clock and phase bias corrections, tropospheric zenith and ionospheric slant delays and integer ambiguities with real GPS measurements, the Multi-GNSS Experiment (MGEX) stations described in MONTENBRUCK [15] were used and 11 clusters were defined as shown in FIG. 12. The reference cluster and the reference receiver of each cluster are highlighted. The number of receivers per cluster is additionally provided in the upper left corner of each cluster.

A pre-processing was performed to eliminate outliers, to correct for cycle slips and to estimate the measurement noise statistics. The process noise statistics were modeled according to Table 2.

Figure 15:
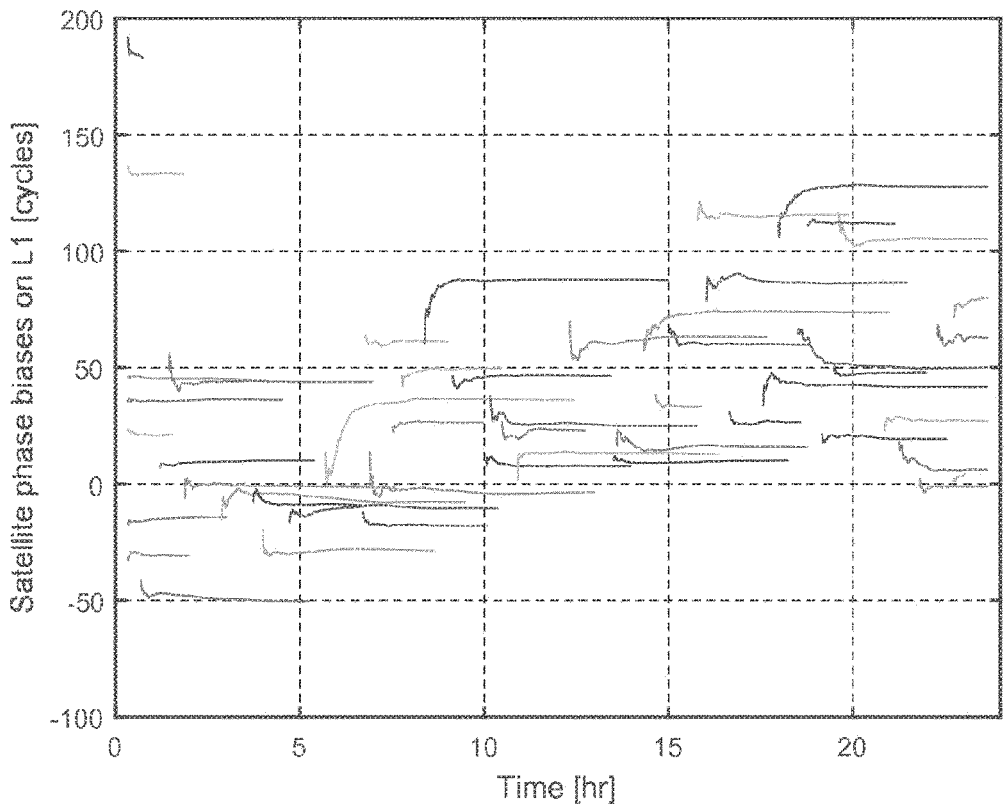
FIG. 15 shows satellite phase bias estimates on L1 with float ambiguities on DOY 150/2017, derived from the Western European cluster solution.

FIG. 15 shows the estimates of the L1 satellite phase biases of the single-cluster solution of the Western European cluster for float ambiguities. A stable behaviour is observed for the phase bias estimates of almost all satellites. The convergence time ranges from a few to several hours. Therefore, the phase bias estimates referring to satellites being observed only for a short amount of time do not converge sufficiently.

Figure 16:
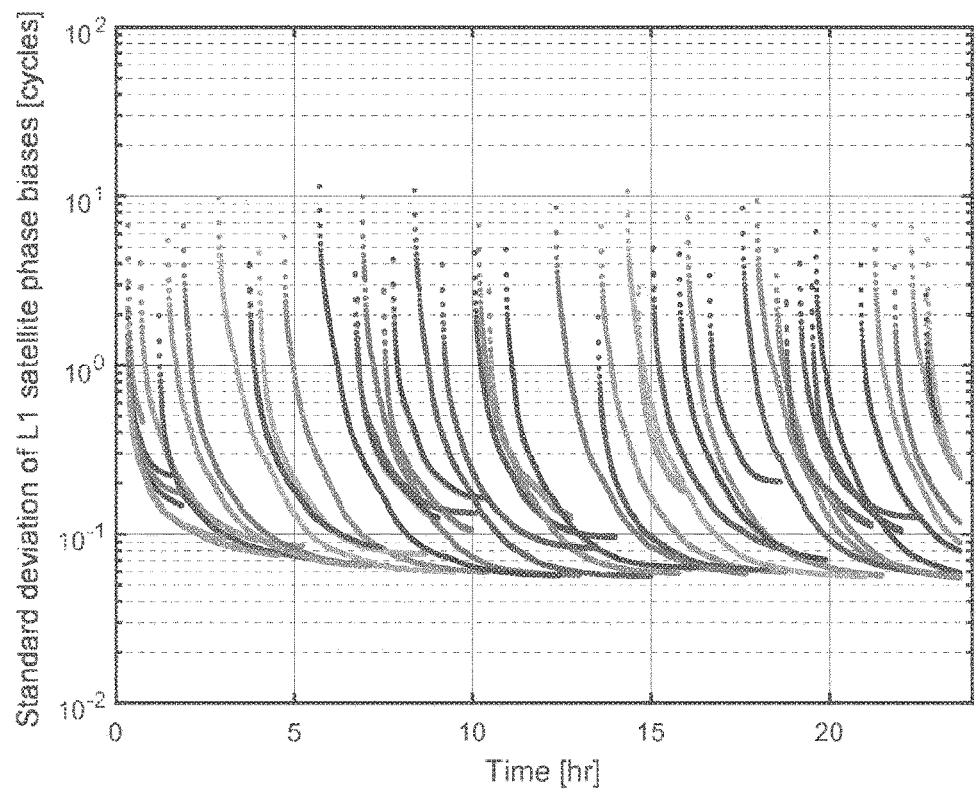
FIG. 16 shows the standard deviation of satellite phase bias estimates on L1 with float ambiguities on DOY 150/2017, derived from the Western European cluster solution.

FIG. 16 illustrates the achieved precision of the L1 satellite phase bias estimates. The convergence time for satellite phase bias estimates of newly tracked satellites is in the order of three hours. A precision of 0.05 and 0.20 cycles, or 1 and 4 cm respectively, is achieved after initial convergence.

Figure 17:
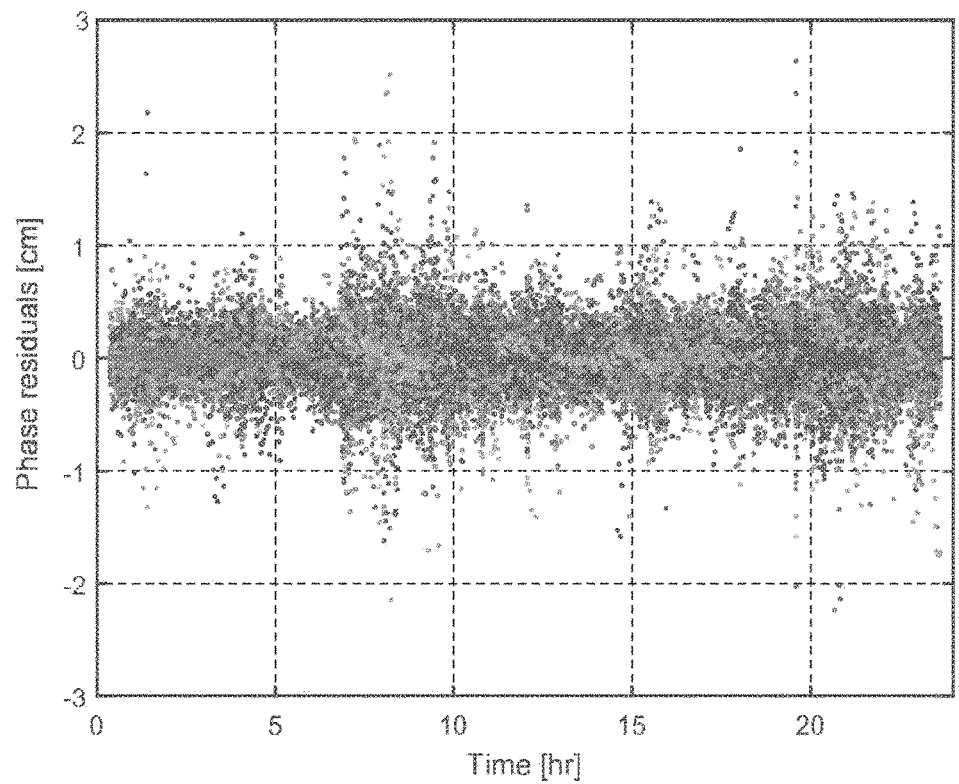
FIG. 17 shows code and phase measurement residuals on DOY 150/2017, derived from the Western European cluster solution.

FIG. 17 shows the fixed phase measurement residuals for DOY 150/2017, derived again from the Western European single cluster solution. The residuals are an indicator for the quality of the measurement model and the used observations, since the former include the measurement noise, multipath and other unmodeled effects. The phase residuals do not exceed the level of 3 cm, and remain even below 1 cm for 99.7% of the time, which confirms the high quality of the selected data.

Figure 18:
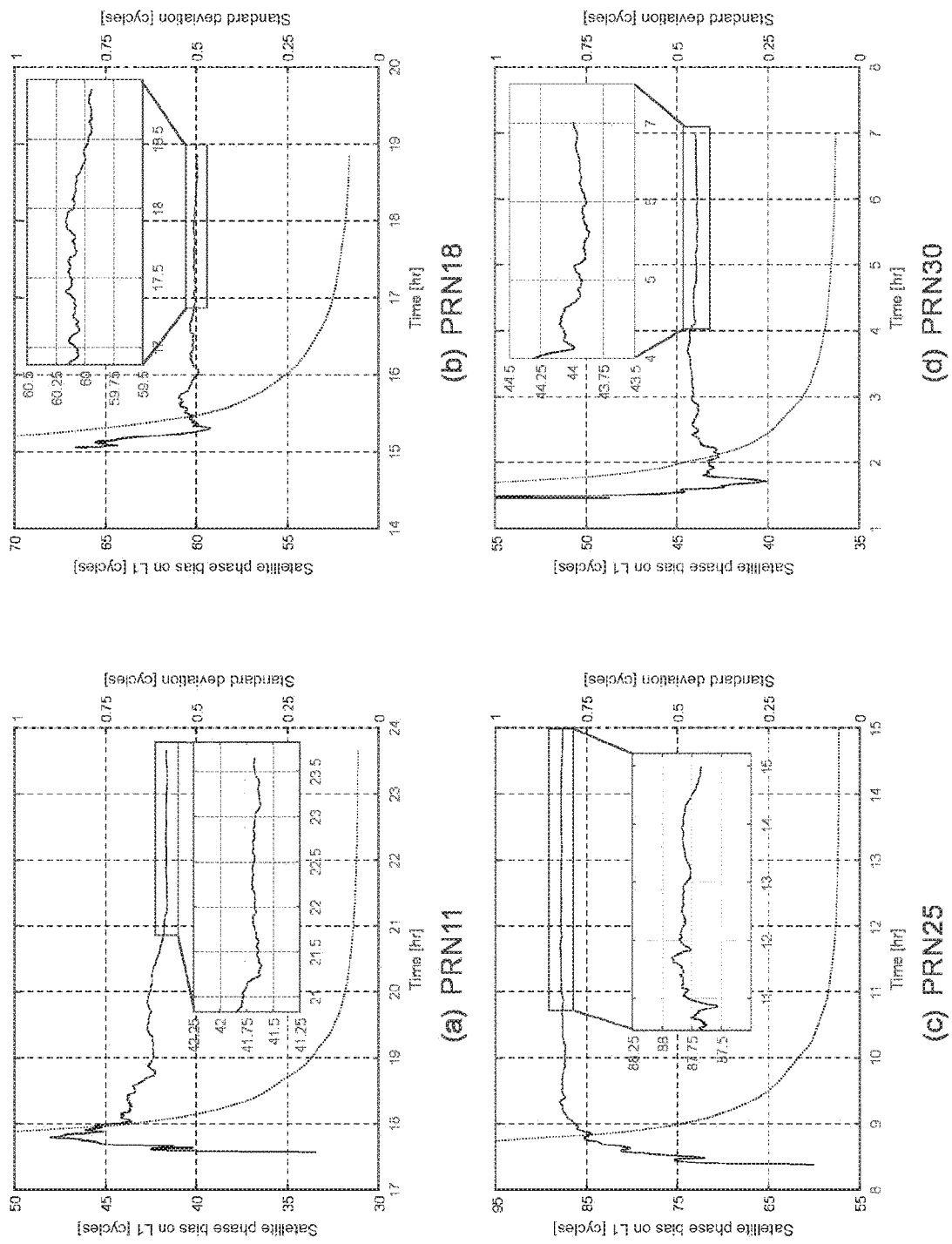
FIG. 18 shows satellite phase bias estimates on L1 along with their standard deviations for four representative GPS satellites on DOY 150/2017, derived from the Western European cluster solution.

FIG. 18 presents a more precise picture of the satellite phase bias estimates by depicting the L1 satellite phase biases of four representative GPS satellites, plus their formal standard deviations. It can be clearly seen that the satellite phase biases show a high stability with variations between 2 and 5 cm per hour during a satellite's pass. An hour or even less is sufficient for the bias estimates to converge to an almost constant value. It has to be noted that the value of the satellite phase biases is irrelevant, as the phase bias and ambiguity of the reference receiver are mapped to the absolute satellite phase biases. Moreover, the formal precision of the satellite phase biases on L1 reaches the 0.10 cycles (:2 cm) level after 2 hours, while the stable level of 0.05 cycles (:1 cm) is achieved after about 5 hours.

Figure 19:
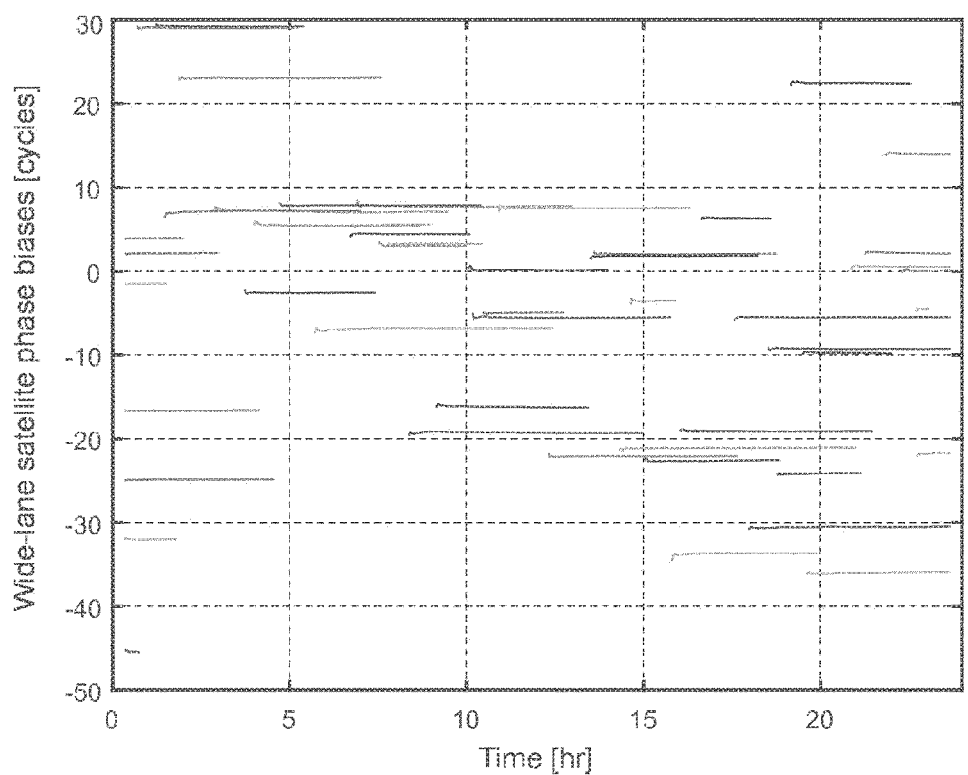
FIG. 19 shows widelane satellite phase bias estimates with float ambiguities on DOY 150/2017, derived from the Western European cluster solution.

FIG. 19 shows the widelane (L1-L2) satellite phase bias estimates obtained by differencing the satellite phase bias estimates on frequencies L1 and L2. The errors of the satellite phase bias estimates on frequencies L1 and L2 are highly correlated and mostly drop by differencing. Therefore, the widelane phase bias estimates show an even higher stability over time than the uncombined satellite phase bias estimates on L1 and L2.

8. Conclusion

The method described herein can be used for the estimation of satellite position, clock and phase bias corrections, tropospheric zenith and ionospheric slant delays, and integer ambiguities with a global network of reference stations. Undifferenced and uncombined measurements of an arbitrary number of frequencies were processed such that the method can be applied to any type of differenced or combined measurements. The method uses a parameter mapping, that enables a full rank system and maintains the integer property of ambiguities for a maximum number of ambiguities. This mapping was derived from a global perspective.

The method splits the global network into multiple clusters and selects a reference receiver and reference satellite within each cluster as well as one reference cluster among all clusters. The clustering enables a common satellite visibility within each cluster and, thus, the exploitation of the integer property of double difference ambiguities. A Kalman filter was set up for each cluster to estimate satellite position, dock and phase bias corrections, atmospheric delays and ambiguities. An integer decorrelation and sequential adjustment was used to fix the double difference ambiguities within each cluster, and to adjust all other state parameters respectively. Subsequently, the satellite position, dock and phase bias corrections of each cluster were combined into a global multi-cluster solution by a least-squares estimation. Finally, an integer decorrelation and sequential adjustment was used again to fix the double difference ambiguities related to reference stations of different clusters, and to re-adjust the other state parameters.

The proposed method was validated with both simulated Galileo measurements and real GPS measurements of the global IGS network. It was possible to obtain satellite position, clock and phase bias corrections with an accuracy of better than 2 cm.

It should be noted that the method described here in detail, includes the determination of particular parameters. This is based on a typical scenario in which the parameters cannot be derived otherwise. If the parameters, however, can be determined by other means, it might be possible to reduce the set of parameters to be determined.

It should also be noted that the method can be implemented by a computer program product, that contains code for implementing the method described herein, if the code is executed by a processor either in one of the base station 8 or the processing unit 14 connected to the network 12 including the base stations 8. In some embodiments, the computer program product may be code stored on a computer readable data carrier such as a disc, a compact disc or a digital versatile disc or the like. In other embodiments, the computer program product may also be code stored on a data storage unit on a server or an array of servers. Such a data storage unit may be a hard disc or an array of hard disc or the like. In further embodiments, the data carrier may also be an electrical carrier signal that can be used for transferring the code from a server, which can be used for downloading the program code to a client.

It should further be noted that throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith.

TABLE 1

Main characteristics of the reduced parameter set for the combined solution of multiple cluster-wise solutions (C, K and M denote the number of clusters, satellites and frequencies.)

| | Notation | Dimensions | Lumped parameters |
|---|---|---|---|
| satellite phase biases | $\tilde{\mu}(k,m)$ | KM | satellite code biases receiver phase and code biases of ref. receiver at ref. cluster integer ambiguity of ref. receiver at ref. cluster |
| receiver phase biases | $\tilde{\mu}(k,m)$ | $(C-1)M$ | receiver phase bias of ref. receiver at ref. cluster integer ambiguities of ref. receiver at cluster and ref. cluster |
| double difference integer ambiguities between ref. receivers at ref. cluster and any other cluster | $\tilde{w}(k,c,m)$ | $(C-1)M(K-1)$ | |

TABLE 2

Process noise statistics and accuracy of prior information.

| State parameters | $\sigma_x$ | $\sigma_{\bar{x}}$ |
|---|---|---|
| Satellite position corrections | 0.02 m | 1.0 m |
| Receiver clock offsets | 1 m | — |
| Satellite clock offset corrections | 1 m | 1.5 m |
| Tropospheric zenith delays | 0.002 m | — |
| Ionospheric slant delays | 0.02 m | — |
| Receiver phase biases | 0.001 m | — |
| Satellite phase biases | 0.001 m | — |
| Integer ambiguities | 0 | — |

REFERENCES

[1] Zumberge J F, Heflin M B, Jefferson D C, Watkins M M, Webb F H (1997) Precise Point Positioning for the efficient and robust analysis of GPS data from large networks. J of Geophysical Research 102:5005-5017

[2] Kouba J, Héroux P (2000) GPS Precise Point Positioning using IGS orbit products. GPS Solutions 5:12-28

[3] Dach R, Hugentobler U, Fridez P, Meindl M (2007) Bernese GPS Software Version 5.0, User manual. Astronomical Institute, University of Bern, Switzerland

[4] Ge M, Gendt G, Rothacher M, Shi C, Liu J (2008) Resolution of GPS carrier-phase ambiguities in Precise Point Positioning (PPP) with daily observations. Journal of Geodesy 82:389-399

[5] Laurichesse D, Mercier F, Berthias J P (2010) Real-time PPP with undifferenced integer ambiguity resolution, experimental results. In: Proc. of 23rd ION GNSS, ION, Portland, Oreg., USA, pp 2534-2544

[6] Wen Z, Henkel P, Gunther C (2011) Reliable Estimation of Phase Biases of GPS Satellites with a Local Reference Network. In: Proc. of 53rd Int. IEEE Symp. ELMAR, IEEE, Zadar, Croatia, pp 321-324

[7] Blewitt G (1989) Carrier Phase Ambiguity Resolution for the Global Positioning System Applied to Geodetic Baselines up to 2000 km. J of Geophysical Research 94(B8):10,187-10,203

[8] Teunissen P J G (1995) The least-squares ambiguity decorrelation adjustment: a method for fast GPS ambiguity estimation. Journal of Geodesy 70:65-82

[9] Teunissen P J G (1998) Success probability of integer GPS ambiguity rounding and bootstrapping. Journal of Geodesy 72:606-612

[10] Brack A, Henkel P, Gunther C (2013) Sequential Best Integer-Equivariant Estimation for Geodetic Network Solutions. In: Proc. of ION ITM, ION, San Diego, Calif., USA, pp 310-317

[11] Henkel P, Mittmann U, Iafrancesco M (2016) Real-time Kinematic Positioning with GPS and GLONASS. In: Proc. of 24th European Signal Processing Conference (EUSIPCO), IEEE, Budapest, Hungary, pp 1-5

[12] Li X, Ge M, Dousa J Wickert J (2014) Real time precise point positioning regional augmentation for large GPS reference networks, GPS Solustions 19 pp 61-71

[13] Bryson A E, Henriksen L J (1968) Estimation using sampled data containing sequentially correlated noise. Journal of Spacecraft and Rockets 5(6):662-665

[14] Brown R G, Hwang P Y C (2012) Introduction to Random Signals and Applied Kalman Filtering

[15] Montenbruck O, Steigenberger P, Prange L, Deng Z, Zhao Q, Perosanz F, Romero I, Noll C, St¨urze A, Weber G, Schmid R, MacLeod K, Schaer S (2016) The Multi-GNSS Experiment (MGEX) of the International GNSS Service (IGS)—Achievements, Prospects and Challenges. Advances in Space Research 59(7):1671-1697

The invention claimed is:

1. A method for Precise Point Positioning in a satellite navigation system comprising a plurality of navigations satellites and a plurality of base stations each provided with a receiver, that receives satellite signals and is used for determining ambiguity-free phase biases and further instrumental and atmospheric errors, wherein the errors are arranged for being transmitted to navigation devices and arranged for being used by the navigation devices for performing Precise Point Positioning including ambiguity fixing, the method including:
   obtaining code and phase measurements, which were performed on the satellite signals by the plurality of receivers at two or more frequencies,
   determining separate individual values for a plurality of phase ambiguities and a plurality of the errors based on the code and phase measurements, wherein:
   the receivers are grouped into clusters,
   in each cluster a determination of a single cluster solution is performed, in which satellite errors selected from the group of satellite position errors, satellite clock errors and the ambiguity-free satellite phase biases are determined based on the phase and code measurements performed by the receivers of the respective cluster;
   a determination of a multi-cluster solution is performed, in which values of the selected satellite errors, which were determined in different clusters, are adjusted by an estimation process applied to the values of the selected errors determined in different clusters.

2. The method according to claim 1, wherein the vector elements of the measurement vector formed for the determination of the single cluster solution are undifferenced and uncombined code and phase measurements.

3. The method according to claim 1, wherein the determination of the single cluster solution comprises the following operations:
   the code and phase measurements are used to form a measurement vector,
   variables for unknown phase ambiguities and unknown errors are mapped into other variables in order to establish a state vector and a full-rank observation matrix between the measurement vector and the state vector, and
   a recursive state estimator is performed using the observation matrix for estimating values for the variables in each cluster.

4. The method according to claim 3, wherein, in each cluster, phase ambiguities are determined together with the selected satellite error and an intermediate phase ambiguity fixing is performed while performing the recursive state estimator.

5. The method according to claim 3, wherein, in each cluster, the state vector comprises a selection of parameters selected from the group including satellite position corrections, receiver and satellite clock errors, tropospheric zenith delays, slant ionospheric delays, receiver and satellite phase biases, and double difference integer ambiguities.

6. The method according to claim 5, wherein, in each cluster:
   the satellite clock error and satellite code biases are mapped into the receiver clock errors,
   the phase bias and the phase ambiguities of the reference receiver are mapped to satellite phase biases, and
   the ambiguities of the reference satellite are mapped to receiver biases.

7. The method according to claim 3, wherein the determination of the multi-cluster solution comprises the following operations:
   the results obtained for the state vector by performing the determination of a single cluster solution are used to form a composed further measurement vector,
   variables for phase biases and phase ambiguities to be determined are mapped into other phase biases and phase ambiguities and composed with variables for the selected satellite errors to establish a further state vector and a full-rank observation matrix between the further measurement vector and the further state vector, and
   values for the variables of the state vector are estimated by a least-square-estimation.

8. The method according to claim 7, wherein the least-square-estimation is followed by an operation in which the phase ambiguities are fixed, and a further operation, in which the selected satellite error are adjusted.

9. The method according to claim 7, wherein one of the clusters is selected as a reference cluster and wherein the further state vector comprises:
   the satellite position errors,
   satellite clock offsets, which relate to the reference satellite clock errors of the reference cluster and include a differential satellite clock error, that is defined as the difference between the reference satellite clock error of the respective cluster and the satellite clock errors at the reference cluster,
   satellite phase biases, in which the satellite code biases, the receiver phase and code biases and phase ambiguities of the reference receiver at the reference cluster are mapped,
   receiver phase biases, in which the receiver phase bias of the reference receiver at the reference cluster and integer ambiguities of the reference receiver at the reference cluster and at any other cluster are mapped,
   double difference integer ambiguities between the reference receivers at the reference cluster and any other cluster.

10. The method according to claim 1, wherein, in each cluster, a temporal reference satellite is selected among the satellites associated with the cluster, wherein instrumental errors of the satellites associated with the respective cluster are determined as differential errors with respect to the errors of the respective reference satellite.

11. The method according to claim 1, wherein, in each cluster, a permanent reference receiver is selected.

12. The method according to claim 1, wherein the clusters are non-overlapping clusters.

13. A network of base stations for a satellite navigation system, the network comprising a plurality of base stations each provided with a receiver arranged for receiving satellite signals from a plurality of navigation satellites and the network being arranged for determining ambiguity-free phase biases and further instrumental and atmospheric errors wherein the errors are provided for being transmitted to navigation devices and provided for being used by the navigation devices for performing Precise Point Positioning including ambiguity fixing, the network of base stations being arranged for performing a method including:
   obtaining code and phase measurements, which were performed on the satellite signals by the plurality of receivers at two or more frequencies,
   determining separate individual values for a plurality of phase ambiguities and a plurality of the errors based on the code and phase measurements, wherein:

the receivers are grouped into clusters, in each cluster a determination of a single cluster solution is performed, in which satellite errors selected from the group of satellite position errors, satellite clock errors and the ambiguity-free satellite phase biases are determined based on the phase and code measurements performed by the receivers of the respective cluster;

a determination of a multi-cluster solution is performed, in which values of the selected satellite errors, which were determined in different clusters, are adjusted by an estimation process applied to the values of the selected errors determined in different clusters and using the phase and code measurements performed in the clusters.

14. A non-transitory computer-readable storage medium that stores instructions, which, when carried out by at least one processor, cause a method for Precise Point Positioning in a satellite navigation system comprising a plurality of navigations satellites and a plurality of base stations each provided with a receiver, that receives satellite signals and is used for determining ambiguity-free phase biases and further instrumental and atmospheric errors, wherein the errors are arranged for being transmitted to navigation devices and arranged for being used by the navigation devices for performing Precise Point Positioning including ambiguity fixing, the method including:

obtaining code and phase measurements, which were performed on the satellite signals by the plurality of receivers at two or more frequencies, determining separate individual values for a plurality of phase ambiguities and a plurality of the errors based on the code and phase measurements, wherein:

the receivers are grouped into clusters, in each cluster a determination of a single cluster solution is performed, in which satellite errors selected from the group of satellite position errors, satellite clock errors and the ambiguity-free satellite phase biases are determined based on the phase and code measurements performed by the receivers of the respective cluster;

a determination of a multi-cluster solution is performed, in which values of the selected satellite errors, which were determined in different clusters, are adjusted by an estimation process applied to the values of the selected errors determined in different clusters.

15. A mobile navigation device for Precise Point Positioning in a satellite navigation system comprising a plurality of navigations satellites and a plurality of base stations each provided with a receiver, that receives satellite signals and is used for determining ambiguity-free phase biases and further instrumental and atmospheric errors, wherein the errors are arranged for being transmitted to the navigation device and arranged for being used by the navigation device for performing Precise Point Positioning including ambiguity fixing, the mobile navigation device comprising a receiver for receiving satellite navigation signals and comprising a processing unit arranged for receiving the errors and for processing the satellite navigation signals and the errors for performing the Precise Point Positioning including ambiguity fixing, the errors being determined by a method including:

obtaining code and phase measurements, which were performed on the satellite signals by the plurality of receivers at two or more frequencies, determining separate individual values for a plurality of phase ambiguities and a plurality of the errors based on the code and phase measurements, wherein:

the receivers are grouped into clusters, in each cluster a determination of a single cluster solution is performed, in which satellite errors selected from the group of satellite position errors, satellite clock errors and the ambiguity-free satellite phase biases are determined based on the phase and code measurements performed by the receivers of the respective cluster;

a determination of a multi-cluster solution is performed, in which values of the selected satellite errors, which were determined in different clusters, are adjusted by an estimation process applied to the values of the selected errors determined in different clusters.

16. A method for Precise Point Positioning in a satellite navigation system having a plurality of navigation satellites transmitting satellite signals, and a plurality of base stations each provided with one or more receivers that receive the satellite signals, comprising:

performing code and phase measurements on the satellite signals by the receivers at two or more frequencies;

determining separate individual values of phase ambiguities and of one or more satellite errors selected from a group consisting of satellite position errors, satellite clock errors, and ambiguity-free satellite phase biases based on the phase and code measurements of the satellite signals, wherein:

the receivers are grouped into clusters, and in each cluster, a single cluster solution is performed, in which phase ambiguities and the satellite errors selected from a group of satellite position errors, satellite clock errors, and ambiguity-free satellite phase biases are determined based on the code and phase measurements of the satellite signals received by receivers in the cluster; and a multi-cluster solution is performed, in which the satellite errors selected from a group of satellite position errors, satellite clock errors, and ambiguity-free satellite phase biases which were determined in different clusters are adjusted by an estimation process; and transmitting the adjusted satellite errors to one or more navigation devices.

17. The method of claim 16, wherein the single cluster solution provides a measurement vector.

18. The method of claim 17, wherein the measurement vector comprises vector elements which are undifferenced and uncombined satellite signals' code and phase.

19. The method of claim 16, wherein the determination of the single cluster solution comprises the following operations:

the satellite signals' code and phase are used to determine a measurement vector, variables for unknown phase ambiguities and unknown errors are mapped into other variables in order to establish a state vector and a full-rank observation matrix between the measurement vector and the state vector, and a recursive state estimator is performed using the observation matrix for estimating values for the variables in each cluster.

20. The method of claim 19, wherein, in each cluster, phase ambiguities are determined together with the selected satellite error and an intermediate phase ambiguity fixing is performed while performing the recursive state estimator.

21. The method of claim 19, wherein, in each cluster, the state vector comprises a selection of parameters selected from the group including satellite position corrections, receiver and satellite clock errors, tropospheric zenith delays, slant ionospheric delays, receiver and satellite phase biases, and double difference integer ambiguities.

22. The method of claim 19, wherein the determination of the multi-cluster solution comprises the following operations:
the results obtained for the state vector by performing the determination of a single cluster solution are used to form a composed further measurement vector,
variables for phase biases and phase ambiguities to be determined are mapped into other phase biases and phase ambiguities and composed with variables for the selected satellite errors to establish a further state vector and a full-rank observation matrix between the further measurement vector and the further state vector, and
values for the variables of the state vector are estimated by a least-square-estimation.

23. The method of claim 22, wherein the least-square-estimation is followed by an operation in which the phase ambiguities are fixed, and a further operation, in which the selected satellite errors are adjusted.

24. The method of claim 22, wherein one of the clusters is selected as a reference cluster and wherein the further state vector comprises:
the satellite position errors,
satellite clock offsets, which relate to the reference satellite clock errors of the reference cluster and include a differential satellite clock error, that is defined as the difference between the reference satellite clock error of the respective cluster and the satellite clock errors at the reference cluster,
satellite phase biases, in which the satellite code biases, the receiver phase and code biases and phase ambiguities of the reference receiver at the reference cluster are mapped,
receiver phase biases, in which the receiver phase bias of the reference receiver at the reference cluster and integer ambiguities of the reference receiver at the reference cluster and at any other cluster are mapped,
double difference integer ambiguities between the reference receivers at the reference cluster and any other cluster.

25. The method of claim 16, wherein, in each cluster, a temporal reference satellite is selected among the satellites associated with the cluster, wherein instrumental errors of the satellites associated with the respective cluster are determined as differential errors with respect to the errors of the respective reference satellite.

26. The method of claim 16, wherein, in each cluster, a permanent reference receiver is selected.

27. The method of claim 16, wherein, in each cluster:
the satellite clock error and satellite code biases are mapped into the receiver clock errors,
the phase bias and the phase ambiguities of the reference receiver are mapped to satellite phase biases, and
the ambiguities of the reference satellite are mapped to receiver biases.

28. The method of claim 16, wherein the clusters are non-overlapping clusters.

* * * * *